US011083549B2

(12) United States Patent
Jacoby et al.

(10) Patent No.: US 11,083,549 B2
(45) Date of Patent: Aug. 10, 2021

(54) DENTAL IMPLANT

(71) Applicant: MIS Implants Technologies Ltd., Bar Lev Industrial Park (IL)

(72) Inventors: Yuval Jacoby, Tel-Aviv (IL); Nitzan Bichacho, Tel-Aviv (IL); Dror Sarig, Shekhanya (IL)

(73) Assignee: MIS Implants Technologies Ltd., Bar Lev Industrial Park (IL)

( * ) Notice: Subject to any disclaimer, the term of this patent is extended or adjusted under 35 U.S.C. 154(b) by 0 days.

(21) Appl. No.: 15/119,775

(22) PCT Filed: Feb. 18, 2015

(86) PCT No.: PCT/IL2015/050185
§ 371 (c)(1),
(2) Date: Aug. 18, 2016

(87) PCT Pub. No.: WO2015/125139
PCT Pub. Date: Aug. 27, 2015

(65) Prior Publication Data
US 2017/0049539 A1 Feb. 23, 2017

Related U.S. Application Data

(60) Provisional application No. 61/942,197, filed on Feb. 20, 2014.

(51) Int. Cl.
*A61C 8/00* (2006.01)
*A61C 8/02* (2006.01)

(52) U.S. Cl.
CPC .......... *A61C 8/0037* (2013.01); *A61C 8/0006* (2013.01); *A61C 8/006* (2013.01);
(Continued)

(58) Field of Classification Search
CPC ..... A61C 8/0037; A61C 8/006; A61C 8/0006; A61C 8/00–0098
See application file for complete search history.

(56) References Cited

U.S. PATENT DOCUMENTS 4,722,688 A 2/1988 Lonca
4,960,381 A * 10/1990 Niznick ............... A61C 8/0022
433/173

(Continued)

FOREIGN PATENT DOCUMENTS

CN 103153225 6/2013
DE 102008063397 7/2010
(Continued)

OTHER PUBLICATIONS

Decision of Reexamination dated Jan. 24, 2018 From the State Intellectual Property Office of the People's Republic of China Re. Application No. 201280037636.2. (17 Pages).
(Continued)

*Primary Examiner* — Yogesh P Patel

(57) ABSTRACT

Dental implant embodiments comprising one or more non-annular cutaways from a portion of the crown are described. In some embodiments, cutaways, which are implantable beneath the bone line, are orientable during implantation by reference to a dental implant positioning tool to which the dental implant is mated in a known orientation. Mating, in some embodiments, is secured by a detent system which reversibly interlocks the positioning tool and the implant. In some embodiments, a surface of a cutaway is provided with protrusions which stimulate bone regrowth into the volume which the remainder of the cutaway provides.

22 Claims, 27 Drawing Sheets

(52) U.S. Cl.
CPC .......... *A61C 8/0018* (2013.01); *A61C 8/0022* (2013.01); *A61C 8/0089* (2013.01); *A61C 8/0087* (2013.01)

(56) References Cited

U.S. PATENT DOCUMENTS

| | | | |
|---|---|---|---|
| 5,336,225 A | | 8/1994 | Zang |
| 5,399,090 A | * | 3/1995 | Padros-Fradera ...... A61C 8/005 433/173 |
| 5,454,811 A | | 10/1995 | Huebner |
| 5,785,525 A | * | 7/1998 | Weissman ............ A61C 8/0018 433/174 |
| 6,001,100 A | | 12/1999 | Sherman et al. |
| 6,039,568 A | | 3/2000 | Hinds |
| 6,723,099 B1 | | 4/2004 | Goshert |
| 6,953,463 B2 | | 10/2005 | West, Jr. |
| 7,309,231 B2 | | 12/2007 | Engman |
| D616,097 S | | 5/2010 | Johnson et al. |
| 8,197,255 B2 | | 6/2012 | Fromovich et al. |
| 9,820,831 B2 | | 11/2017 | Cho |
| 2004/0170946 A1 | | 9/2004 | Lyren |
| 2006/0003290 A1 | | 1/2006 | Niznick |
| 2006/0223030 A1 | | 10/2006 | Dinkelacker |
| 2006/0269890 A1 | | 11/2006 | Mundwiler et al. |
| 2007/0072148 A1 | | 3/2007 | Memmolo et al. |
| 2007/0190491 A1 | * | 8/2007 | Blackbeard .......... A61C 8/0018 433/174 |
| 2009/0023109 A1 | | 1/2009 | Jinton et al. |
| 2009/0092944 A1 | | 4/2009 | Pirker |
| 2009/0239195 A1 | | 9/2009 | Wohrle et al. |
| 2009/0325126 A1 | | 12/2009 | Fromovich et al. |
| 2010/0184003 A1 | | 7/2010 | Danza et al. |
| 2010/0196850 A1 | | 8/2010 | Koenig |
| 2010/0196853 A1 | * | 8/2010 | Zipprich ................ A61C 8/005 433/174 |
| 2011/0070558 A1 | | 3/2011 | Park et al. |
| 2011/0223562 A1 | * | 9/2011 | Zipprich .............. A61C 8/0065 433/174 |
| 2012/0178049 A1 | * | 7/2012 | Holmstrom ............ A61C 8/005 433/174 |
| 2012/0264085 A1 | | 10/2012 | Hansson et al. |
| 2013/0230825 A1 | | 9/2013 | Kenk et al. |
| 2013/0244203 A1 | | 9/2013 | Magnusson et al. |
| 2014/0030674 A1 | | 1/2014 | Nguyen |
| 2014/0106305 A1 | | 4/2014 | Jacoby et al. |
| 2014/0205969 A1 | * | 7/2014 | Marlin .................... A61C 9/004 433/173 |
| 2016/0317253 A1 | * | 11/2016 | Duerr ................... A61C 8/0054 |
| 2020/0078146 A1 | | 3/2020 | Jacoby et al. |

FOREIGN PATENT DOCUMENTS

| | | |
|---|---|---|
| EP | 1882458 | 1/2008 |
| EP | 1943980 | 7/2008 |
| JP | 2004-529698 | 9/2004 |
| JP | 2013-078428 | 5/2013 |
| KR | 10-1050236 | 7/2011 |
| KR | 10-2013-0113776 | 10/2013 |
| WO | WO 97/06930 | 2/1997 |
| WO | WO 01/06944 | 2/2001 |
| WO | WO 02/0080804 | 10/2002 |
| WO | WO 2005/065571 | 7/2005 |
| WO | WO 2008/157137 | 12/2008 |
| WO | WO 2008/157138 | 12/2008 |
| WO | WO 2010/072211 | 7/2010 |
| WO | WO 2012/164560 | 12/2012 |
| WO | WO 2012/173577 | 12/2012 |
| WO | WO 2013/037729 | 3/2013 |
| WO | WO 2013/037730 | 3/2013 |
| WO | WO 2013/186765 | 12/2013 |
| WO | WO 2015/125139 | 8/2015 |

OTHER PUBLICATIONS

Communication Pursuant to Article 94(3) EPC dated Sep. 12, 2018 From the European Patent Office Re. Application No. 15713237.4.
Summons to Attend Oral Proceedings Pursuant to Rule 115(1) EPC Dated Jul. 19, 2018 From the European Patent Office Re. Application No. 12793774.6. (6 Pages).
Decision of Reexamination dated Jan. 24, 2018 From the State Intellectual Property Office of the People's Republic of China Re. Application No. 201280037636.2 and Its Machine Translation Into English. (44 Pages).
Communication Pursuant to Article 94(3) EPC dated Sep. 18, 2017 From the European Patent Office Re. Application No. 12793774.6. (4 Pages).
Applicant-Initiated Interview Summary dated Jan. 23, 2019 From the US Patent and Trademark Office Re. U.S. Appl. No. 14/123,289. (3 pages).
Notice of Preliminary Rejection dated Feb. 18, 2019 From the Korean Intellectual Property Office, Patent Examination Policy Office Re. Application No. 10-2013-7035023 and Its Translation Into English. (11 Pages).
Notice of Reason for Rejection dated Jan. 22, 2019 From the Japan Patent Office Re. Application No. 2016-553475 and Its Translation Into English. (9 Pages).
Notification of Office Action and Search Report dated Jan. 21, 2019 From the State Intellectual Property Office of the People's Republic of China Re. Application No. 201580020795.5. (9 Pages).
Translation dated Feb. 14, 2019 of Notification of Office Action dated Jan. 21, 2019 From the State Intellectual Property Office of the People's Republic of China Re. Application No. 201580020795. 5. (6 Pages).
Official Action dated Nov. 17, 2017 From the US Patent and Trademark Office Re. U.S. Appl. No. 14/123,289. (16 pages).
Applicant-Initiated Interview Summary dated Nov. 14, 2014 From the US Patent and Trademark Office Re. U.S. Appl. No. 14/123,289.
Communication Relating to the Results of the Partial International Search dated Jun. 23, 2015 From the International Searching Authority Re. Application No. PCT/IL2015/050185.
Decision of Rejection dated Sep. 29, 2016 From the State Intellectual Property Office of the People's Republic of China Re. Application No. 201280037636.2 and Its Translation Into English.
Examination Report dated Nov. 9, 2016 From the Republica de Colombia, Superintendencia de Industria y Comercio Re. Application No. NC2016/0000996 and Its Translation Into English. (4 Pages).
Examination Report dated Sep. 16, 2016 From the Republica de Colombia, Superintendencia de Industria y Comercio Re. Application No. NC2016/0000996 and Its Translation Into English. (5 Pages).
International Preliminary Report on Patentability dated Sep. 1, 2016 From the International Bureau of WIPO Re. Application No. PCT/IL2015/050185.
International Preliminary Report on Patentability dated Dec. 12, 2013 From the International Bureau of WIPO Re. Application No. PCT/IL2012/000218.
International Search Report and the Written Opinion dated Sep. 13, 2012 From the International Searching Authority Re. Application No. PCT/IL2012/000218.
International Search Report and the Written Opinion dated Aug. 20, 2015 From the International Searching Authority Re. Application No. PCT/IL2015/050185.
Notice of Reason for Rejection dated Mar. 25, 2016 From the Japan Patent Office Re. Application No. 2014-513308 and Its Translation Into English.
Notification of Office Action and Search Report dated Nov. 2, 2015 From the State Intellectual Property Office of the People's Republic of China Re. Application No. 201280037636.2.
Notification of Office Action and Search Report dated Jun. 20, 2016 From the State Intellectual Property Office of the People's Republic of China Re. Application No. 201280037636.2.
Office Action dated Dec. 22, 2016 From the Israel Patent Office Re. Application No. 229758 and Its Translation Into English. (6 Pages).
Official Action dated Jul. 1, 2014 From the US Patent and Trademark Office Re. U.S. Appl. No. 14/123,289.

(56) References Cited

OTHER PUBLICATIONS

Official Action dated Nov. 4, 2016 From the US Patent and Trademark Office Re. U.S. Appl. No. 14/123,289.
Official Action dated Apr. 7, 2016 From the US Patent and Trademark Office Re. U.S. Appl. No. 14/123,289.
Official Action dated Jul. 14, 2015 From the US Patent and Trademark Office Re. U.S. Appl. No. 14/123,289.
Official Copy of Decision of Rejection dated Nov. 4, 2016 From the Japan Patent Office Re. Application No. 2014-513308 and Its Translation Into English. (9 Pages).
Request for Examination dated May 23, 2016 From the ROSPATENT, Federal Government Institutions, Federal Institute of Industrial Property of the Federal Service for Intellectual Property, Patent and Trademarks of the Russian Federation Re. Application No. 2013158082 and Its Translation Into English.
Supplementary European Search Report and the European Search Opinion dated Nov. 4, 2014 From the European Patent Office Re. Application No. 12793774.6.
Translation dated Nov. 17, 2015 of Notification of Office Action and Search Report dated Nov. 2, 2015 From the State Intellectual Property Office of the People's Republic of China Re. Application No. 201280037636.2.
Translation of Notification of Office Action dated Jun. 20, 2016 From the State Intellectual Property Office of the People's Republic of China Re. Application No. 201280037636.2.
Abuhussein et al. "The Effect of Thread Pattern Upon Implant Osseointegration", Clinical Oral Implant Research, 21: 129-136, 2010.
Office Action dated Jan. 18, 2017 From the Israel Patent Office Re. Application No. 229758 and Its Translation Into English. (5 Pages).
Notification of Reexamination dated Jun. 28, 2017 From the State Intellectual Property Office of the People's Republic of China Re. Application No. 201280037636.2 and Its Translation Into English. (19 Pages).
Official Action dated Jun. 29, 2018 From the US Patent and Trademark Office Re. U.S. Appl. No. 14/123,289. (13 pages).
Translation dated Jun. 28, 2018 of Notification of Office Action dated May 31, 2018 From the State Intellectual Property Office of the People's Republic of China Re. Application No. 201580020795. 5. (4 Pages).
Notification of Office Action and Search Report dated May 31, 2018 From the State Intellectual Property Office of the People's Republic of China Re. Application No. 201580020795.5 and Its Summary in English. (8 Pages).
Official Action dated Apr. 6, 2017 From the US Patent and Trademark Office Re. U.S. Appl. No. 14/123,289. (19 pages).
Patent Examination Report dated May 24, 2019 From the Australian Government, IP Australia Re. Application No. 2015220389. (7 Pages).
Provision of a Copy of the Minutes in Accordance With Rule 124(4) EPC Dated Apr. 10, 2019 From the European Patent Office Re. Application No. 12793774.6. (8 Pages).

Communication Pursuant to Article 94(3) EPC dated Aug. 29, 2019 From the European Patent Office Re. Application No. 15713237.4. (5 Pages).
Notice of Reason for Rejection dated Aug. 27, 2019 From the Japan Patent Office Re. Application No. 2016-553475 and Its Translation Into English. (9 Pages).
Notification of Office Action dated Sep. 25, 2019 From the State Intellectual Property Office of the People's Republic of China Re. Application No. 201580020795.5. (9 Pages).
Translation dated Oct. 17, 2019 of Notification of Office Action dated Sep. 25, 2019 From the State Intellectual Property Office of the People's Republic of China Re. Application No. 201580020795. 5. (8 Pages).
Examination Report Under Sections 12 & 13 of the Patents Act, 1970 and the Patents Rules, 2003 dated Jan. 30, 2020 From the Government of India, Intellectual Property India, Patents, Designs, Trade Marks, Geographical Indications, the Patent Office Re. Application No. 2408/MUMNP/2013.
Office Action dated Feb. 27, 2020 From the Israel Patent Office Re. Application No. 247345 and Its Translation Into English. (8 Pages).
Office Action dated Mar. 4, 2020 From the Israel Patent Office Re. Application No. 247345. (5 Pages).
Search Report and Explanation dated Mar. 22, 2020 From the Servico Publico Federal, Ministerio da Economia, Instituto Nacional da Propriedade Industrial do Brasil Re. Application No. BR112013030990-3 and Its Summary in English. (5 Pages).
Notice of Reason for Rejection dated Apr. 28, 2020 From the Japan Patent Office Re. Application No. 2016-553475. (5 Pages).
Notification of Office Action dated Apr. 23, 2020 From the State Intellectual Property Office of the People's Republic of China Re. Application No. 201580020795.5. (7 Pages).
Summons to Attend Oral Proceedings Pursuant to Rule 115(1) EPC Dated Jul. 23, 2020 From the European Patent Office Re. Application No. 15713237.4. (10 Pages).
European Search Report and the European Search Opinion dated May 18, 2020 From the European Patent Office Re. Application No. 19191143.7. (6 Pages).
Translation dated May 7, 2020 of Notice of Reason for Rejection dated Apr. 28, 2020 From the Japan Patent Office Re. Application No. 2016-553475. (4 Pages).
Translation dated May 20, 2020 of Notification of Office Action dated Apr. 23, 2020 From the State Intellectual Property Office of the People's Republic of China Re. Application No. 201580020795. 5. (9 Pages).
Office Action dated May 31, 2020 From the Israel Patent Office Re. Application No. 254322 and Its Translation Into English. (11 Pages).
Examination Report dated Sep. 30, 2020 From the Instituto Mexicano de la Propiedad Industrial, IMPI, Secretaria de Economia, Direccion Divisional de Patentes Re. Application No. MX/a/2016/010825 and Its Translation Into English. (8 Pages).

* cited by examiner

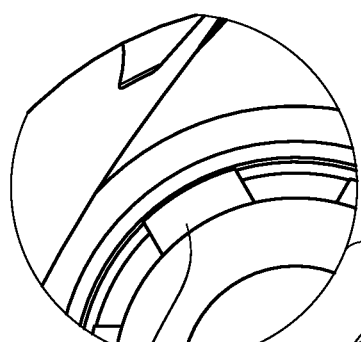
FIG. 2B
FIG. 2A
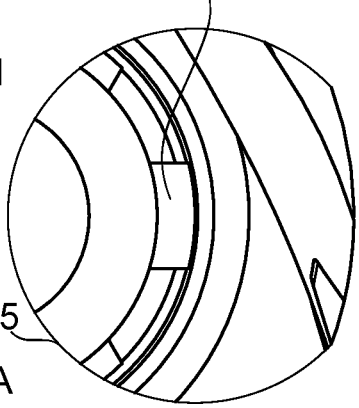
FIG. 2C
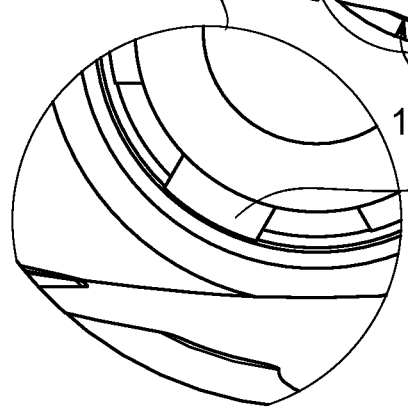
FIG. 2D

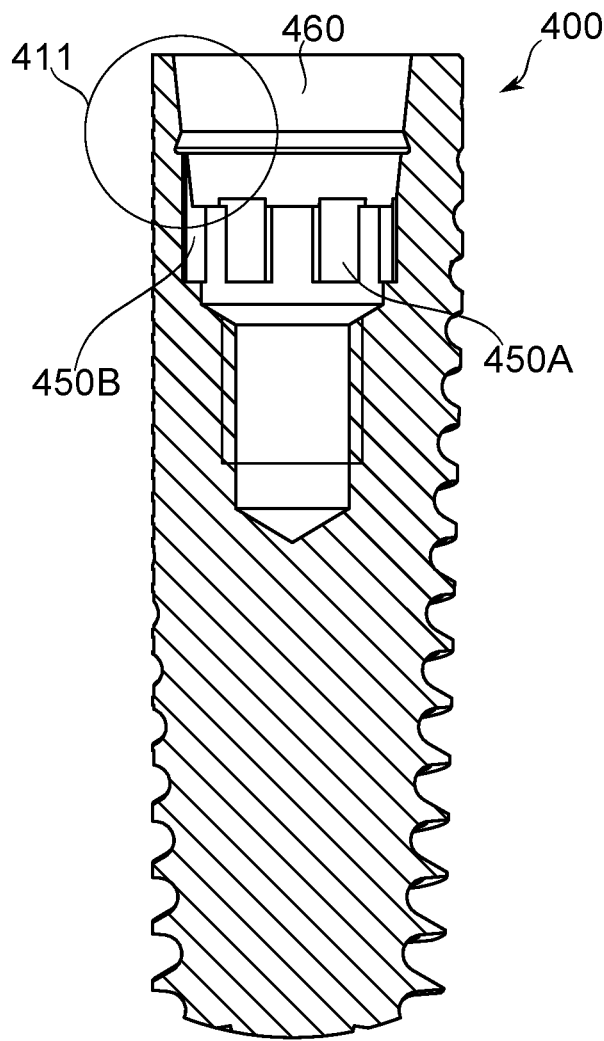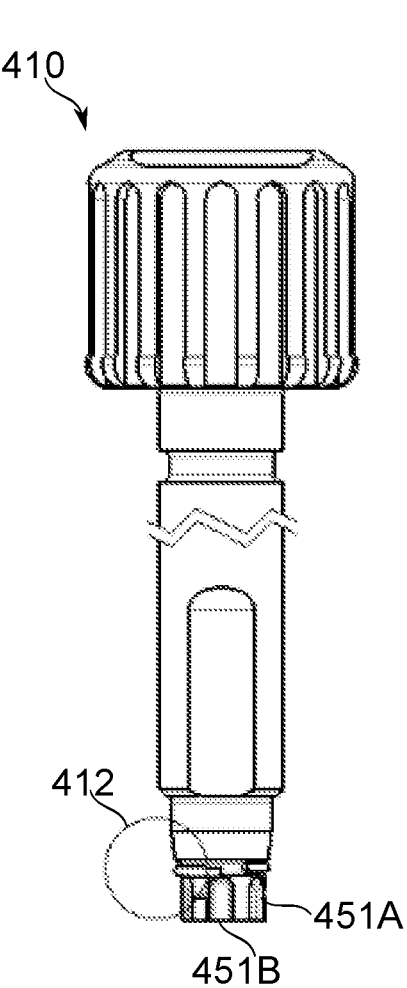
FIG. 4A            FIG. 4B
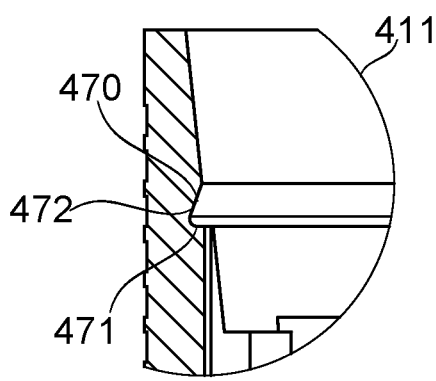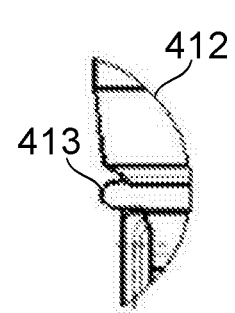
FIG. 4C            FIG. 4D

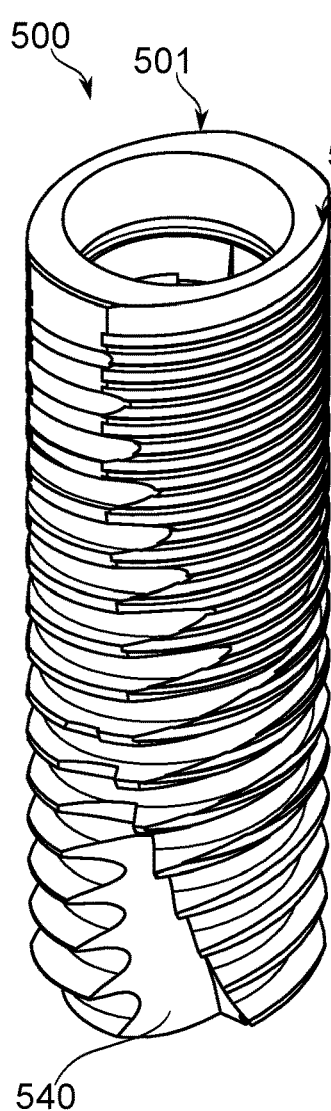
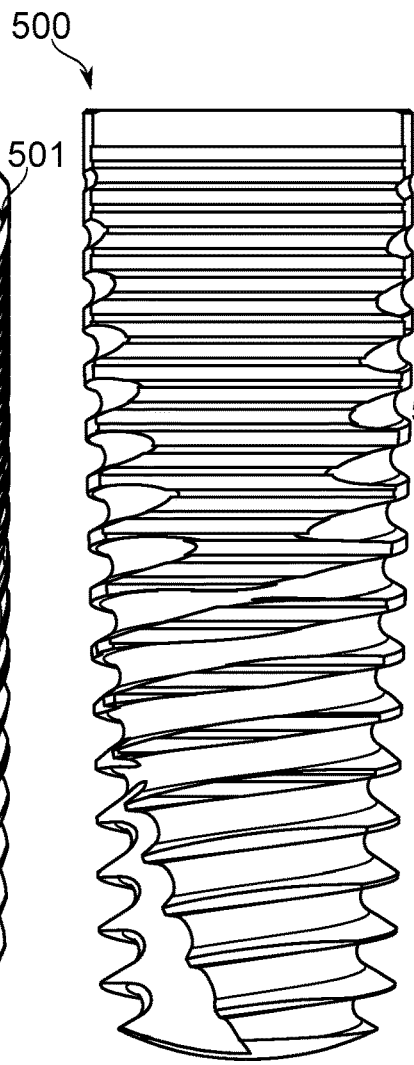
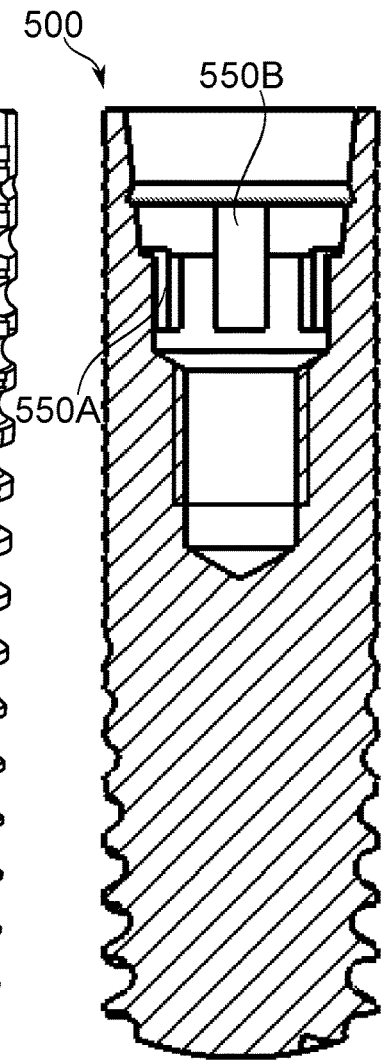
FIG. 5A    FIG. 5B    FIG. 5C
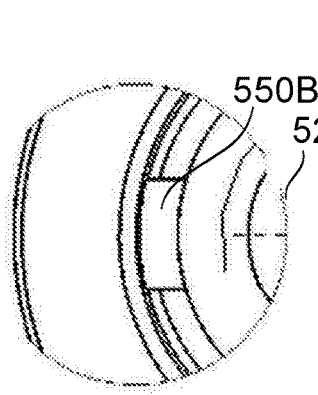
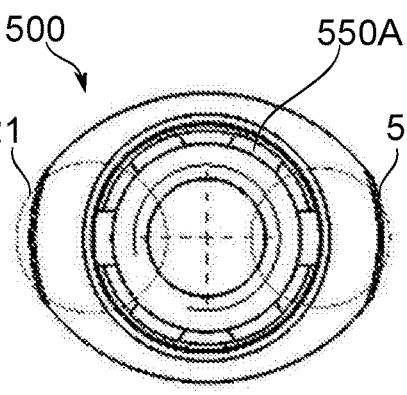
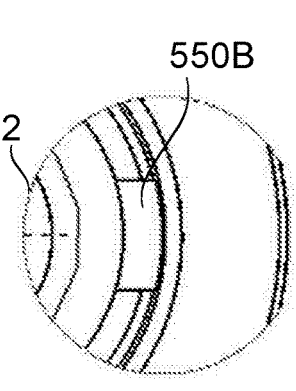
FIG. 5D    FIG. 5E    FIG. 5F

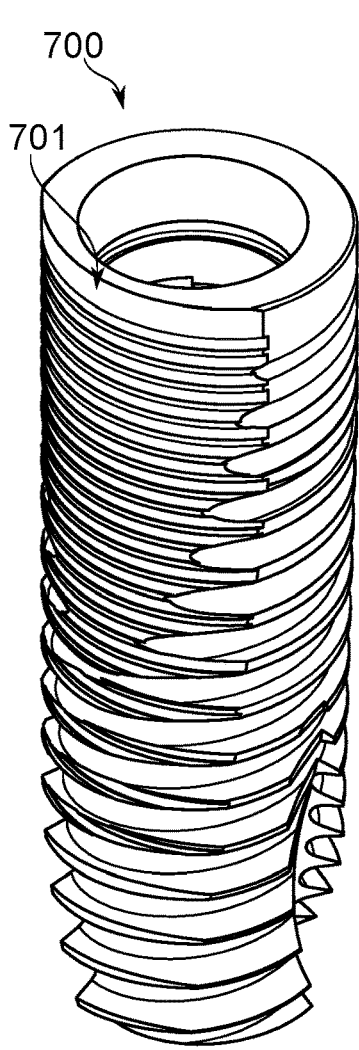
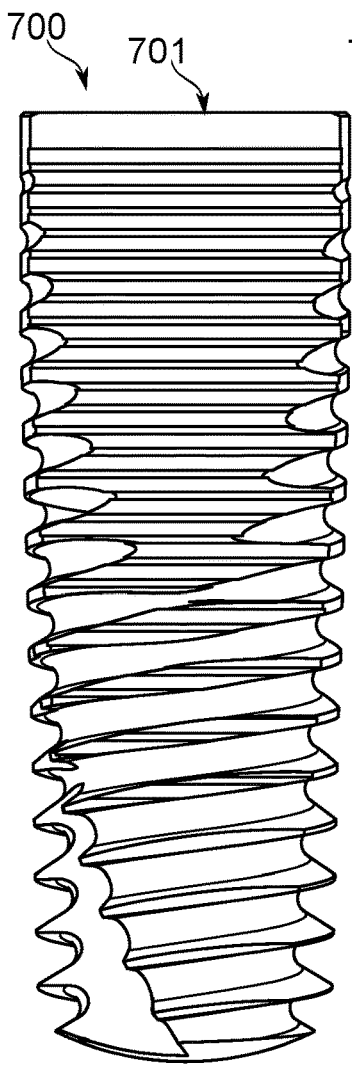
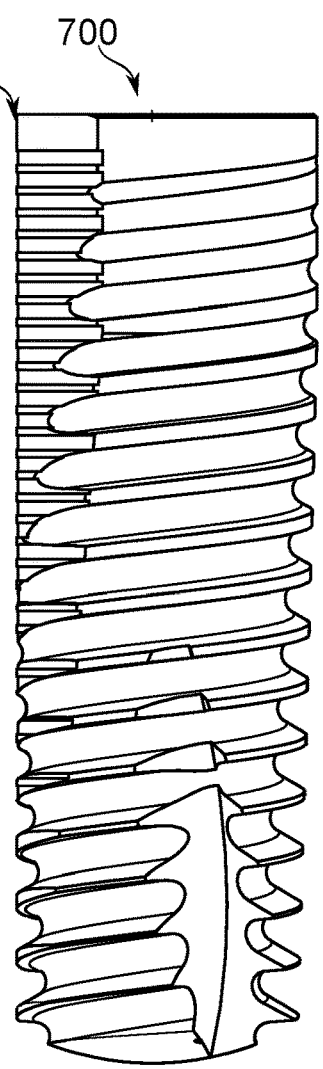
FIG. 7A  FIG. 7B  FIG. 7C
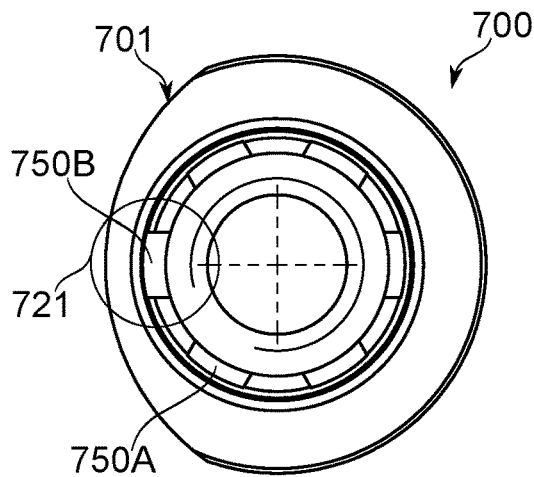
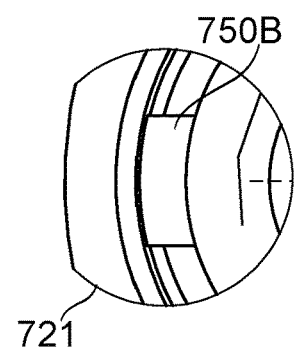
FIG. 7D  FIG. 7E

DENTAL IMPLANT

FIELD AND BACKGROUND OF THE INVENTION

The present invention relates to the field of dental implants and, more particularly, to design of the implant head reliable insertion, and/or for stabilizing hard and soft tissues surrounding the implant, the abutment and the prosthesis connected to it.

Dental implants are used to replace teeth that have been lost. An implant is placed in the jaw bone at the site of the missing tooth and a dental prosthetic unit is attached to it. The long term functional and aesthetic success of dental implants, and the prostheses attached to them, is determined by the response of the hard and soft tissues around them, and in particular by the degree of tissue loss which occurs around the implant.

Tissue loss can be mitigated by implant design. Implant designs having reduced connection diameter providing more soft tissue volume above the implant head and around the prosthetic abutment have shown better hard and soft tissue maintenance. Thin bone regions remain vulnerable to bone loss, however. Apart from loss of potential mechanical support, this bone loss may be aesthetically disturbing, for example, in anterior implants, where degenerated buccal and/or interdental septal regions are exposed in the smile.

Thicker buccal bone and larger bone volume are associated with reduced bone loss and reduced soft tissue loss. Locating the implant head away from the buccal plate or interdental septum may help preserve bone thickness, as long as a successful outcome is not hindered by insufficient bone ridge size relative to implant dimensions, and/or by interference among multiple implants. Smaller diameter implants are sometimes used, where a corresponding sacrifice in mechanical strength of fixation and/or connection is acceptable. Some one-piece implants trade away prosthetic flexibility for a more compact design.

Additional background art includes International Patent Application Publication No. WO 2012/164560 A1.

SUMMARY OF THE INVENTION

According to an aspect of some embodiments of the invention, there is provided a dental implant for rotationally-oriented implantation in a jaw bone, comprising: a body having a longitudinal extent along a coronal-apical axis; the body having N distinct facing directions around the coronal-apical axis, wherein N is at least one; and a receiving volume defined by surfaces for receiving an interlocking portion of a dental implant implanting tool; wherein the surfaces are arranged to interlock with the interlocking portion in one of exactly N orientations.

According to some embodiments of the invention, the N orientations of interlocking provided by the receiving surfaces angularly correspond to the N distinct facing directions of the dental implant body; thereby allowing an orientation of the facing directions to be determined from an orientation of a dental implant implanting tool when the tool is interlocked to one of the N orientations by the receiving surfaces.

According to some embodiments of the invention, N is between 1 and 3.

According to some embodiments of the invention, N is 2 or 3.

According to some embodiments of the invention, each of the facing directions is defined by a feature of the shape of the outer surface along the longitudinal extent.

According to some embodiments of the invention, each of the facing directions is defined by the orientation of a cutaway region relative to the coronal-apical axis.

According to some embodiments of the invention, the cutaway region is buried within bone when the dental implant is implanted.

According to some embodiments of the invention, the N interlocked orientations are positioned in a sequence of relative angles around the coronal-apical axis which is the same as a sequence of relative angles in which the N facing directions are positioned around the coronal-apical axis.

According to some embodiments of the invention, all of the relative angles are equal.

According to some embodiments of the invention, N of the torque receiving surfaces are comprised in the receiving surfaces.

According to some embodiments of the invention, the receiving volume comprises a plurality of notches configured with a surface oriented to receive torquing force from the implanting tool, at least a first of the notches being distinct in shape from at least a second of the notches.

According to some embodiments of the invention, the at least first notch comprises N notches.

According to some embodiments of the invention, the plurality of notches comprises six notches equally distributed around the coronal-apical axis.

According to some embodiments of the invention, the receiving volume comprises a polygonal prism defined by the surfaces of the bore hole, the polygonal prism being configured such that the interlocking portion is insertable to it in one of exactly N orientations.

According to some embodiments of the invention, the polygonal prism is a hexagonal prism.

According to some embodiments of the invention, N is between 1 and 3.

According to an aspect of some embodiments of the present invention, there is provided an dental implant implanting tool for rotationally keyed insertion into a receiving volume of a dental implant, comprising: an interlocking portion sized and shaped to insert into the receiving volume, the receiving volume being shaped for mating thereto in one of N mating orientations; and the interlocking portion being mateable to the dental implant in one of exactly N orientations; wherein the interlocking portion, when mated to the dental implant, is rotatable by rotation of the implanting tool such that it exerts torque on at least N+1 torque-receiving surfaces of the dental implant.

According to some embodiments of the invention, the torque-receiving surfaces are comprised in the surfaces which define the N mating orientations of the receiving volume.

According to an aspect of some embodiments of the present invention, there is provided a holding system for attaching a dental implant for implantation in a jaw bone to a dental implant implanting tool, comprising: a body of the dental implant having a longitudinal extent along a coronal-apical axis; a bore hole extending apically along the coronal-apical axis from an aperture on a coronal end of the body; the bore hole comprising at least one longitudinally extending wall portion, wherein a more apical section of the longitudinally extending wall portion is offset radially outward relative to a more coronal section thereof; a portion of the implanting tool bearing an elastic element and sized to insert within the bore hole; wherein the elastic element is sized and positioned to interlock with a region defined by the radially offset section, when the implanting tool is fully inserted into the bore hole.

According to some embodiments of the invention, the inset region comprises at least a portion of a ring cut into the perimeter of the bore hole.

According to some embodiments of the invention, the dental implant and the implanting tool are constrained by mutual interference to a fixed rotational orientation before the elastic element and the inset region interlock.

According to an aspect of some embodiments of the present invention, there is provided a method of encouraging bone growth in a jaw bone near a dental implant, comprising: selecting a dental implant with at least one cutaway section in an intrabony portion thereof; attaching the dental implant to a dental implant implanting tool, locking the dental implant and the implanting tool into a relative orientation selected from among one or predetermined relative orientations; inserting the dental implant into a bore in the jaw bone, adjacent to a thin portion of bone; the inserting comprising orienting a volume extending through a region of the cutaway section such that the volume is adapted to fill with bone thickness gained by the thin portion of bone; and allowing new bone growth from the thin portion of bone into the volume; wherein the orienting of the volume comprises inspection of an orientation of the dental implant implanting tool; and the thin portion of bone comprises a portion of one of the group consisting of a buccal bone plate, lingual bone plate, and an interdental septum.

According to an aspect of some embodiments of the present invention, there is provided a method of encouraging bone growth in a jaw bone near a dental implant, comprising: selecting a dental implant with a cutaway section in an intrabony portion thereof; inserting the dental implant into a bore in the jaw bone, adjacent to a thin portion of bone; the inserting comprising orienting a volume extending through a region of the cutaway section such that the volume is adapted to fill with bone thickness gained by the thin portion of bone; and providing contact stimulation to the thin portion of bone by a protrusion from within the cutaway section; wherein the contact stimulation promotes new bone growth from the thin portion of bone into the volume; and the thin portion of bone comprises a portion of one of the group consisting of a buccal bone plate, lingual bone plate, and an interdental septum.

According to an aspect of some embodiments of the present invention, there is provided a dental implant for implantation in a jaw bone, comprising: an implant body sized for implanting of an intrabony portion thereof within the jaw bone; the body having at least one side surface defining an inner boundary of a non-annular cutaway volume longitudinally extending along one side of the body comprised in the intrabony portion; the side surface being positionable to place the volume between the side surface and a portion of the jaw bone to which the side surface is the closest implant surface, when the body is implanted; and the side surface comprising at least one protrusion extending toward the portion of the jaw bone; wherein the at least one protrusion, upon osseointegration with the portion of the jaw bone, anchors the implant body so as to limit movement along an apical-coronal axis thereof.

According to some embodiments of the invention, the at least one protrusion is positioned on the side surface such that it contacts the portion of the jaw bone upon initial implantation at a radially outward surface of the protrusion.

According to some embodiments of the invention, the contact does not comprise anchoring that limits movement along the apical-coronal axis.

According to an aspect of some embodiments of the present invention, there is provided a dental implant for implantation in a jaw bone, comprising: an implant body sized for implanting of an intrabony portion thereof within the jaw bone; the body having at least one side surface defining an inner boundary of a non-annular cutaway volume longitudinally extending along one side of the body comprised in the intrabony portion; the side surface being positionable to place the volume between the side surface and a portion of the jaw bone to which the side surface is the closest implant surface, when the body is implanted; wherein the side surface is curved transversely to the longitudinal extent with a radius of curvature of between 10-19 cm.

According to an aspect of some embodiments of the present invention, there is provided a dental implant for implantation in a jaw bone, comprising: an implant body sized for implanting of an intrabony portion thereof within the jaw bone; the body comprising an externally threaded core having a non-circular cross-section; wherein the threads of the threaded core beginning from at least 5 mm away from the apical tip of said core define a cylindrical surface having tapering along its length of up to from 0% to 50% of its maximum diameter.

According to an aspect of some embodiments of the invention, there is provided a dental implant for rotationally-oriented implantation in a jaw bone, including: a body having a longitudinal extent along a coronal-apical axis; the body having N distinct facing directions around the coronal-apical axis, wherein N is at least two; and a receiving volume defined by surfaces for receiving an interlocking portion of a dental implant implanting tool; wherein the surfaces are arranged to interlock with the interlocking portion in one of N or fewer orientations.

According to an aspect of some embodiments of the invention, there is provided a dental implant for rotationally-oriented implantation in a jaw bone, including: a body having a longitudinal extent along a coronal-apical axis; the body having N distinct facing directions around the coronal-apical axis, wherein N is at least one; and a receiving volume defined by surfaces for receiving an interlocking portion of a dental implant implanting tool; wherein the surfaces are arranged to interlock with the interlocking portion in one of N+1 or more orientations.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIGS. 2A-2D illustrate shape-keyed torque notches positioned for alignment of side faces of a dental implant to a jawbone, according to some exemplary embodiments of the invention;

FIGS. 4A and 4C illustrate sectional side views of an abutment-receiving bore hole having a receiving detent for a complementary detent mating mechanism of an implant positioning tool, according to some exemplary embodiments of the invention;

FIGS. 4B and 4D illustrate side views of an implant positioning tool having an elastic ring element configured for insertion to a holding depression of the implant of FIG. 4A, according to some exemplary embodiments of the invention;

FIGS. 5A-5C, respectively, show perspective, side, and sectional side views of a dental implant having a body with two longitudinal cutaway regions, according to some exemplary embodiments of the invention;

FIGS. 5D-5F illustrate shape-keyed torque notches positioned for alignment of cutaway regions of a dental implant to a jawbone, according to some exemplary embodiments of the invention;

FIGS. 7A-7C, respectively, show perspective and two orthogonal side views of a dental implant having a body with a single cutaway region extending along an apical-coronal axis, and a keyed set of torque-receiving notches for receiving a correspondingly shaped insertion tool, according to some exemplary embodiments of the invention;

FIGS. 7D-7E illustrate shape-keyed torque notches configured for alignment of cutaway regions of a dental implant using an insertion tool to a jawbone, according to some exemplary embodiments of the invention;

DESCRIPTION OF SPECIFIC EMBODIMENTS OF THE INVENTION

Figure 1A:
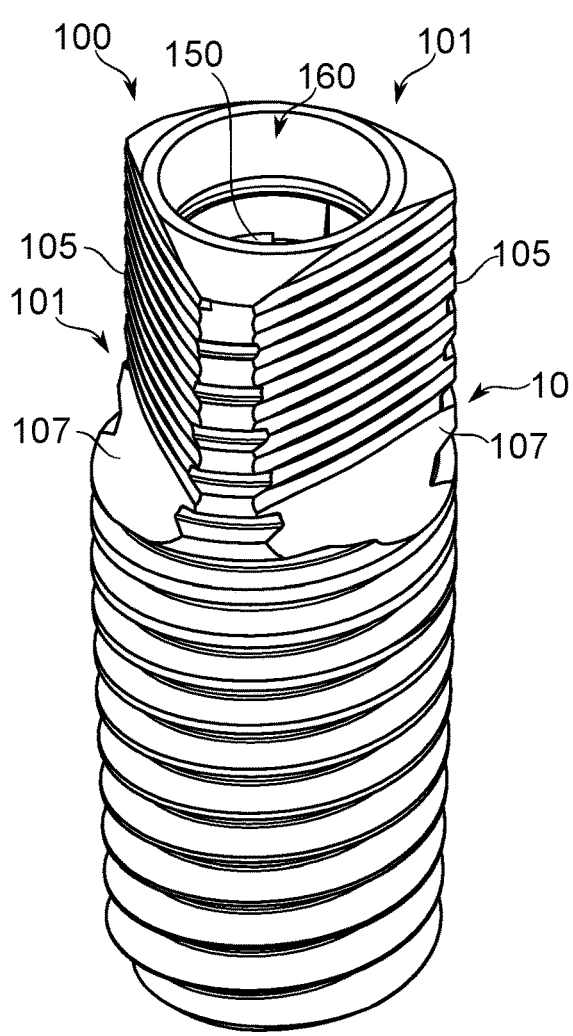
FIGS. 1A-1C illustrate perspective, side, and axial views, respectively, of a three-cutaway dental implant, according to some exemplary embodiments of the invention.

The present invention relates to the field of dental implants and, more particularly, to design of the implant head reliable insertion, and/or for stabilizing hard and soft tissues surrounding the implant, the abutment and the prosthesis connected to it.

Overview

A broad aspect of some embodiments of the invention relates to the provision of cutaway regions from a dental implant, positioned such that thinned bone portions adjacent to the implant can grow into it. Potentially, providing room for regrowth preserves bone which would otherwise be subject to damage resulting in bone volume loss.

In some embodiments of the invention, one or more cutaway regions is provided extending over an intrabony region extending into the jaw from at least the bone line of an implanted dental implant. The more superficial portion of the jaw surrounding an aveolus prepared for receiving a dental implant potentially comprises one or more thinned regions on the buccal, lingual, and/or interdental septal sides of the aveolus. Such thinned bone regions are at risk for loss due to loss of vitality and/or mechanical trauma. By providing an open region for thinned bone to grow into, this bone loss is potentially avoided.

Dental implants, in some embodiments of the invention, are constructed of any material used in the art for the construction of a dental implant, for example, titanium and/or zirconium. It is envisioned that over the lifetime of a patent which may mature from this application, other materials will potentially become available and/or accepted for construction of a dental implant, for example, of other metals, or polymeric materials. Dental implants comprised of such materials are envisioned as comprising some embodiments of the present invention.

An aspect of some embodiments of the invention relates to the overall structuring a dental implant such that maintenance, remodeling, and/or regrowth of one or more thinned bone regions is promoted by guided, potentially changing, stress interactions between a cutaway region and the bone. Additionally or alternatively, stress interactions between bone and implant potentially help determine the course of osseointegration.

In general, a distinction is made between three levels of bone stress. Unstressed bone is at risk of disuse atrophy. Overstressed bone is at risk of biological and/or mechanical damage. Overstressing can occur, for example, due to excessive load, and/or due to weakening of the bone (such as by thinning in preparation for receiving a dental implant). Healthily stressed bone receives enough contact or other stress to promote growth, without being damaged in the process.

An aim of some embodiments of the present invention is to manage the stresses occurring at different portions of the dental implant according to the conditions found there. Trabecular (spongy) bone, for example, is typically encountered by the more apical portions of the dental implant. This bone is safely compressible within its mechanical limits, and comprises a large potential supporting volume for the implant. However, it is not especially strong. Thus, apical portions of a dental implant, in some embodiments of the invention, are designed to distribute load over a broad surface area, with the understanding that relatively large displacement of existing bone volume as the implant threads its way in is acceptable. Features which help to distribute load stress include deep threading (for example, to increase surface area), gradual apical-coronal implant broadening (for example, so that more implant portions are involved in pushing away bone), and/or gradual apical-coronal reduction of thread depth (for example, to transfer some load to inter-thread portions of the implant body).

More coronally, the bone is thinner, and more likely to comprise a high fraction of hard, less nourished, but potentially brittle cortical bone. Loss of the most coronal bone sections is particularly undesirable: there are potential aesthetic consequences, by revealing the underlying implant in a patient's smile; and, since this bone defines the limit of the bone line, once lost, there is insufficient remaining tissue to support its return. At the same time, the cortical bone, if thick enough to provide good support, is potentially a preferred location for the transfer of implant stress to the bone, relative to the more deformable trabecular bone.

Thus, in some embodiments of the invention, preservation, rather than anchoring, is the initial priority for vulnerable coronal bone portions. In some embodiments of the invention, the more coronal sections of the dental implant are configured to avoid transmitting major stresses to the bone by being radially offset to within the perimeter of the axial implant profile. Moreover, in some embodiments, room is made for the regrowth of thinned bone regions by the space formed within the cutaway regions. Potentially, this also leads to the later promotion of coronal bone to safely take on some of the function of anchoring, as well.

In some embodiments of the invention, a surface of a cutaway region is positioned, upon proper implantation, such that an initial (immediately post-implantation) region of short-range contact is formed between bone at the level of the cutaway region and the dental implant. For example, the cutaway region extends, in some embodiments, to the limit of the volume swept out by more apical portions of the dental implant. Potentially, this forms an initial region of bone-maintaining contact stress, which expands as bone remodeling occurs in the weeks following implantation. In some embodiments of the invention, the region of contact comprises contact with cortical and/or trabecular bone.

In some embodiments of the invention, the surface of a cutaway region extends (immediately post-implantation) to within a predetermined range of distances from the bone remaining at the same level: for example, to within 10-50 µm, 40-80 µm, 50-200 µm, 150-300 µm, or to within another range of distances having the same, intermediate, greater and/or lesser bounds. Additionally or alternatively, the initial distance is defined (for example, within one of the aforementioned ranges) by a distance between the cutaway region surface and the surface of the volume cleared by more apical portions of the dental implant. Potentially, slight bone regrowth and/or aveolus constriction occurring thereafter is sufficient to initiate contact between a surface of the cutaway region and bone. The contact itself is potentially sufficient to trigger bone regrowth, without engendering damaging implant support stresses upon the contacting bone until further regrowth and strengthening has occurred.

In some embodiments of the invention, surface irregularities are provided at dental implant cutaway surfaces which encourage bone regrowth due to contact stresses as bone regrowth reaches the irregularities. Potentially, they also serve to promote anchoring as osseointegration continues. In some embodiments of the invention, the surface irregularities comprise ridges, grooves, bumps, and/or another shape. In some embodiments, the surface is treated. In some embodiments, the surface irregularities comprise a roughened coating, for example of hydroxyapatite, and/or roughening of an existing surface, for example by etching and/or sand-blowing. In some embodiments, cutaway surface irregularities are shaped to provide one or more early sites of contact between cutaway surface and bone, which sites spread continuously from the original site of contact as bone growth continues into the volume of a cutaway region.

In some embodiments of the invention, cutaway regions (and/or any other gap left between implant and bone when first implanting a dental implant) fill with blood upon implantation. Blood and/or clotted blood is a potential promoter of bone regrowth.

An aspect of some embodiments of the invention relates to the positioning of a dental implant having one or more preferred rotational orientations such that the preferred orientation is easily achieved and/or verified.

In some embodiments of the invention, one or more rotational orientations of a dental implant are preferred in order to align a cutaway region with a region of thinned bone. In some embodiments, there is a preferred orientation corresponding to each of one, two, three, or more provided cutaway regions. In some embodiments of the invention, a preferred orientation is achieved by mating a dental implant to an insertion tool, such that the orientation of the insertion tool (or a portion thereof) dependably indicates the orientation of the dental implant.

In some embodiments of the invention, an insertion tool is marked to indicate its rotational position, relative to one or more preferred rotational positions of a dental implant. The marks are fixed to the tool, in some embodiments (for example, they are constrained to move when the whole tool operates to turn the dental implant). In some embodiments, a first, freely positionable orientation mark is aligned to indicate the preferred direction, and one or more additional orientation marks which rotate with the dental implant are then rotated to align with the indicating mark. Optionally, inspection of one or more marks allows determination of the rotational orientation of the insertion tool.

An aspect of some embodiments of the invention relates to providing complementary keying on a dental implant and on an insertion tool for insertion of the dental implant, such that the rotational orientation of the tool reflects the rotational orientation of the implant.

In some embodiments, surfaces (for example, surfaces of a cutaway region) indicating the rotational orientation of an implant are buried within a jaw bone when said implant is implanted. It is a potential advantage to provide a means, such as the attached extension comprised in an insertion tool, which allows implant orientation to be readily determined without direct inspection of the implant itself.

In some embodiments, a correct relative mating orientation between a dental implant and an insertion tool is ensured by providing each with complementary keying. In some embodiments, notches are used to receive and transfer insertion torque from an insertion tool to a dental implant. Keying, in some embodiments, comprises providing notches of different sizes in a bore of a dental implant, with complementary sizing of inserting portions (teeth) of the insertion tool. Additionally or alternatively, notches are provided at non-uniform relative sequential angles around the bore, such that a restricted selection of insertion tool orientations is able to mate with it. Since the bore, in some embodiments, is provided also in order to receive an abutment (which optionally screws into the dental implant), it is a potential advantage for the notches to be in the bore of the dental implant, while the insertion tool comprises protrusions which insert into them. In some embodiments, however, the assignment of notch and protrusion is inverted, for example, if the threads of the abutment are small enough to fit within the protrusions, and/or if the protrusions themselves are also threaded.

In some embodiments of the invention, keying comprises providing a non-regular polygonal wall to a portion of a dental implant bore, for example, a hexagon having sides of different lengths. In some embodiments of the invention, an insertion tool is provided with a complementary polygon, such that only a restricted number of mating positions are possible (for example only 1, 2, or 3 mating positions to a bore walled by a polygon of 4, 5, 6 or more sides).

In some embodiments, as many or fewer allowable relative mating orientations between the dental implant and the insertion tool are provided relative to a number of distinct facing directions of the dental implant. For example, a dental implant is provided with 1, 2, 3, 4 or more distinct facing directions, with a corresponding number of ensurable mating orientations being selected from among 1, 1-2, 1-3, 1-4, or one to a greater number, respectively. Optionally, facing directions are labeled relative to the available mating orientations. For example, a tool having a single mating orientation to a three facing-direction implant is provided with marks and/or shapes in three positions corresponding with the facing directions. Also for example, a tool having two mating orientations to a three facing-direction implant is provided with marks and/or shapes in three positions corresponding with the facing directions. In some embodiments, the mating orientations selectable are asymmetrically spaced; for example, a 2-way mating for a 3-face implant comprises orientations at 0° and 120°. Optionally, there is an indication such as a mark or shape allowing selection of a third orientation (for example, an orientation at 240°). It is to be understood that the distinct facing directions are optionally distributed at non-isometric angular distances (for example, a three-face implant having faces at 0°, 120°, and 260°; or at any other group of relative angles). Optionally, the locking orientations and/or facing direction indications are correspondingly non-isometric. Irregularly (non-isometrically) distributed facing angles are a potential advantage, for example, to allow a thickness of the implant through one axis (for example, a buccal/lingual axis) to be thinner than through another axis (for example, an axis extending along a jawline).

In some embodiments, more allowable relative mating orientations between the dental implant and the insertion tool are provided relative to a number of distinct facing directions of the dental implant. For example, an implant having a single facing direction is provided with receiving structures for three insertion tool orientations. In some embodiments, the facing directions are 1, 2, 3 or more in number, and tool orientations are 2 or more, 3 or more, 4 or more, or another number of tool orientations. Optionally, the tool is used with the mated implant by orienting the tool to a fixed direction (for example, always buccal-facing), no matter what the tool insertion orientation. Potentially, this allows an initial mating orientation to predetermine where, among a plurality of options (buccal, lingual, and/or tooth-facing, for example), the facing direction will be oriented, while the alignment of the tool to the anatomy of the mouth to select this option remains the same in each case.

Before explaining at least one embodiment of the invention in detail, it is to be understood that the invention is not necessarily limited in its application to the details of construction and the arrangement of the components and/or methods set forth in the following description and/or illustrated in the drawings. The invention is capable of other embodiments or of being practiced or carried out in various ways.

Exemplary 3

Cutaway Implant

Figure 1B:
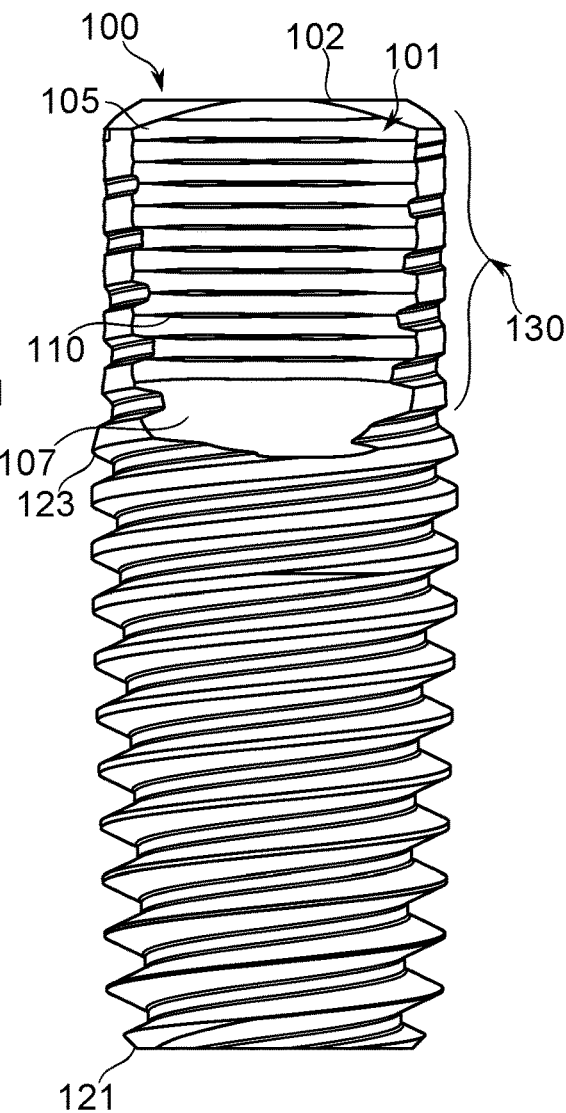
Figure 1C:
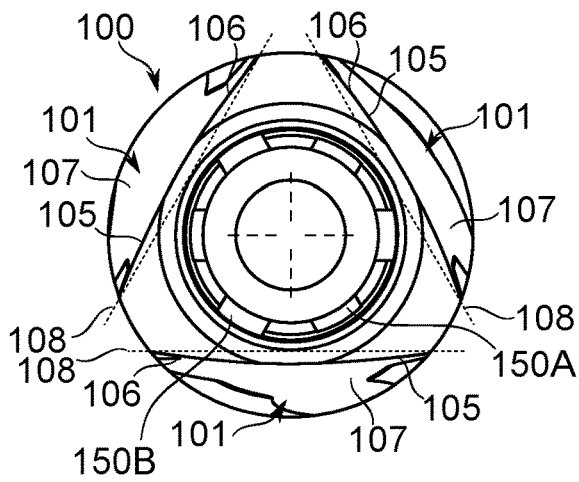

Reference is now made to FIGS. 1A-1C, which illustrate perspective, side, and axial views, respectively, of a three-cutaway dental implant, according to some exemplary embodiments of the invention.

Overview of Implant Features

Coronal Cutaway:

The cutaways of embodiments illustrated, for example, by FIGS. 1A-1C (and described also in relation to many other figures hereinbelow) comprise cutaway regions 101 where a generally cylindrical, tapered-cylindrical, conical, or other radially symmetric enveloping volume of a dental implant 100 is interrupted by a cutback from the surface of the enveloping volume. This potentially leaves room for bone regrowth into the cutaway, near a coronal region of the implant when implanted. In some embodiments, the cutback extends, when the implant is implanted, along an intrabony region between a level beneath the bone line of a tooth socket (aveolus) and at least as far coronally as the existing or planned superficial bone line. In some embodiments, the cutback extends apically from the coronal end 102 of a dental implant. In some embodiments, the cutback extends apically from a region apical to coronal end 102, for example, in embodiments where a portion of the dental implant is designed to protrude above the planned bone line. A potential advantage of such a cutaway region is to leave room for bone to grow into after implantation, such that a sufficient volume of bone is created to prevent atrophy due to bone thinning below a threshold of stable maintenance. Potentially, the cutaway region reduces stress on nearby bone to below a threshold at which bone atrophies due to excessive forces applied to it.

Multiple Cutaways:

In some embodiments of the invention, a plurality of cutaway regions 101 is provided (three cutaway regions are illustrated in FIGS. 1A-1C), spaced about equally around the longitudinal axis of the implant 100. It is a potential advantage to provide a plurality of cutaway regions 101, as this permits more precise axial positioning of the implant, while ensuring that a cutaway face 105 is positionable to run alongside a region of thinned bone at risk of atrophy. It is also a potential advantage to provide cutaway regions facing more than one region of thinned bone. Positioning is also described, for example, in relation to FIGS. 1D-1I, hereinbelow.

Indexed Positioning:

In some embodiments of the invention, positioning of a dental implant 100 is aided by torque notches 150, which comprise notches positioned around the perimeter of a bore hole 160 configured to receive a dental abutment. In some embodiments, an insertion tool is provided with protrusions arranged to match the positioning of the notches. An exemplary insertion tool 410 is described in relation to FIG. 4B hereinbelow. In some embodiments, torque applied to the insertion tool, when it is inserted into the borehole, is transmitted to the implant through the torque notches 150. In some embodiments, the torque notches 150 comprise two or more different notch sizes, for example, notches of different depths, such as shallow notches 150A, and deep notches 150B. In some embodiments, differences in torque notch size and/or relative position limit the orientation of an insertion and/or positioning tool relative to the dental implant when attached thereto. In some embodiments, this limiting allows the orientation of a dental implant 100, to be determined from the orientation of the insertion tool. In particular, the rotational orientation of cutaway regions of a dental implant 100 (or another dental implant, for example, as described in relation to FIGS. 3A-13 herein below) is determinable in some embodiments from the orientation of an insertion tool keyed to fit torquing notches 150A, 150B. In some embodiments, another indexing scheme is provided, for example a keyed polygon, as described, for example, in relation to FIGS. 3A-3E.

Locking Mechanism for an Insertion Tool:

In some embodiments of the invention, an inset wall region such as groove 470 is provided within the borehole 460. The indent comprises, for example, a ring shaped widening region of the implant 470. The groove is optionally matched by a complementary elastic mating mechanism on the insertion tool (for example, clip spring 413 of the insertion tool of FIG. 4B).

Thread Geometry:

In some embodiments of the invention, the main (insertion) thread of an implant comprises a variable profile as it spirals from the apical end to the coronal end of the implant. At the apical end, in some embodiments, the thread projects to a narrow, optionally sharp, tip. As the thread spirals coronally, the outer tip of the thread gradually widens, in some embodiments. By thus "breaking" the tip, but maintaining the same thread protrusion angles and base width, the thread itself becomes shorter in the distance it projects from the body. This potentially allows greater tapering (widening) of the implant body (the region "between the threads"), without inflicting undue stress on the surrounding bone, since the threads do not extend laterally as far as they would if they remained unbroken. A potential advantage of this is to transfer stress more evenly to both the threads and the implant body itself. Gradual widening itself makes each region along the widening length of the implant a "trail breaker", which also potentially helps distribute stress along the implant body. In some embodiments of the invention, a coronal-ward point beyond which an implant ceases to widen (or even narrows again) represents a potential reduction in stress load, at least before bone remodeling occurs. This reduction potentially helps to ensure that thinned portions of bone which are vulnerable to atrophy and/or breakage initially bear somewhat lesser stress than thicker, deeper bone portions. Additionally or alternatively, deeper bone typically comprises spongy, rather than hard cortical bone, making it more compressible, and thus more tolerant of deep thread depths. As the proportion of cortical bone increases, it is a potential advantage to reduce thread depth, to better distribute stresses due to interactions with less compliant bone.

Cutaway Regions

A simplified description of a cutaway region 101, for some exemplary embodiments, comprises the result of (and/or the result as if produced by) an "L"-like cut to a dental implant: downward (toward the apex) along a plane from the coronal end 102 of the implant, and outward (optionally downward and outward) along another plane to the outer surface of an enveloping cylinder, tapered cylinder, or other implant envelope shape. The cutaway region, when the dental implant is implanted in a jaw bone, extends over an intrabony region beneath the bone line.

However, the cutaway region, in some embodiments of the invention, is not limited to a region defined by two cutting planes. In some embodiments of the invention, a portion or all of the implant surface bounding the cutaway region comprises irregularities, for example, microthreads, ridges, grooves, irregular roughening, or another surface treatment. It is a potential advantage for the cutaway surface to be irregular, to promote stresses along regions interfacing with bone which support and/or stimulate bone maintenance and/or regrowth. It should be understood that with respect to bone mass maintenance, there is in general a balance in play between applying excessive stress, which could weaken and/or degenerate bone, for example due to mechanical wear and/or biological distress such as circulatory cutoff; and exerting insufficient stress, wherein bone potentially atrophies (for example, due to disuse), according to Wolff's law of bone remodeling.

As an additional or alternative deviation from the simplified example of a "two plane" cut, in some embodiments of the invention: the cut extending apically from the coronal portion of the cutaway region defines a curved surface (following, for example, extrusion of curves 106, rather than a plane following, for example, extrusion of straight lines 108). In some embodiments, the face curvature follows a radius of, for example, 10 cm, 15 cm, 20 cm, 25 cm, or another greater, lesser, or intermediate curvature. In some embodiments, the face curvature follows a radius of, for example, 6-9 cm, 11-20 cm, 10-19 cm, 20-30 cm, or another range of curvatures having the same, greater, lesser, or intermediate bounds. In some embodiments, more than one curvature is followed, either continuously or abruptly varied over the extent of the cutaway. In some embodiments, one or more portions of the curvature are concave, convex, and/or straight. In some embodiments of the invention, a longitudinal extrusion shape of the curve also follows one or more curvatures, and/or a straight line. Optionally, the curve is convex on the implant body. Optionally, the curve shape is variable along the extent of the cutaway region (even after neglecting irregularities due to threading and/or surface roughening). In some embodiments of the invention, the "second plane" cut defines a curved surface.

In some embodiments, the cut extending apically from the coronal portion of the cutaway region grades continuously (for example, without a clear inflection point, or with an inflection point which does not comprise a clear discontinuity) into a cut angling toward the circumference of the implant—and no "second cut" is present. In some embodiments, the cut extending apically from the coronal portion of the cutaway region begins at an angle which is non-parallel to the outer surface of the implant. Optionally, the angle is such that no change of angle is needed to terminate the cut, since it intersects at some level with the outer circumference of the implant body and/or threading. Optionally, the cut angle, the outer surface, or both is non-parallel to the longitudinal axis of the implant. Additionally or alternatively, the cut extending apically from a coronal portion of the cutaway region extends all the way to the apical end of the implant.

It should be noted that a potential advantage of a non-annular cutaway region geometry, in distinction to an overall reduced radius, is that at least some initial bone stress is maintained at the remaining outer margins of the implant crown, even before bone remodeling occurs. Potentially, this prevents remodeling from passing down the route of disuse atrophy.

With specific regard to the illustrations of FIGS. 1A-1C, horizontal grooving 110 is shown along longitudinally extending surfaces 105 of cutaway regions 101. No particular surface treatment is shown for the angled surfaces 107, but these surfaces are optionally treated, for example, by etching or application of a coating such as hydroxyapatite. It is to be understood that any cutaway region surface can receive such etching or coating treatment in some embodiments of the invention. The axial viewpoint of FIG. 1C shows that the transverse profile of surfaces 105 is defined by convex curves 106 (straight dotted lines 108 are provided for curvature comparison), and the whole surfaces are defined approximately as though these curves were extruded longitudinally along the implant body.

For the sake of illustration, the shape of cutaway embodiments is described hereinabove in terms of cuts made through a solid body. However, as used herein, the word "cutaway" is not limited to embodiments of the invention in which material is actually cut away from an implant body during manufacturing. Thus, a cutaway region, in some embodiments, is considered as "cut away" relative, for example, to a (potentially ideal) bounding volume closely related to the implant shape. Such a volume is, for example, the bounding volume swept out by rotating the implant around its longitudinal axis. Optionally, the manufactured shape of the cutaway region is defined by a mold, and/or is the result of an additive manufacturing process such as 3-D printing.

From a related perspective, a cutaway comprises a structural feature in which an outer surface extending longitudinally (apical-coronally) along an implant is offset toward a longitudinal axis, away from an implicit bounding surface (for example, based on a minimum-diameter right bounding cylinder extending along a portion of the implant length). In some embodiments, the bounding surface diameter varies according to longitudinal position, and/or can be considered to be tapered with a variable diameter, for example, to a barrel shape, tapered so as to form a portion of a bounding cone, or to another tapering defined based on the outline of the dental implant. In FIG. 1B, for example, it is seen that an outer envelope of the implant swept out by rotation of the implant about its longitudinal axis widens coronally from a narrow point at apical region 121, at first quickly and then more gradually to a level of maximum width 123 just below the crest module 130. In transitioning to the crest module 130, the widest radial extent reduces again, with a slight rounding at the coronal end itself. The cutaway regions 101 fall interior to this envelope.

Furthermore, in distinction from threads and threadlike structures, the longitudinal extent of a cutaway, in some embodiments, is greater than the thread pitch, and/or greater than a multiple of the thread pitch, for example, longer than 2-8 or more thread pitch lengths. Additionally or alternatively, a cutaway region, in some embodiments of the invention, extends longitudinally from the coronal end 102 of the dental implant 100 (or another dental implant, for example, as described in relation to FIGS. 3A-13) for a distance of 2-5 mm toward apical region 121. In some embodiments, a cutaway region extends from the coronal end 102 of the dental implant to about half-way along the longitudinal extent of the implant body, for example, for a distance of from 4-11 mm, and/or about half-way down the implant. In some embodiments, a cutaway region extends along the entire longitudinal length of the dental implant.

In some embodiments of the invention, a cutaway region is distinguishable by a cyclical variation in the maximal radial extent of a thread protrusion, wherein the number of cycles from "thinnest" to "thickest" is, for example, 1, 2, 3 or more per rotation along the thread. Optionally, the cycles per rotation is non-integral, for example, such that a surface extends helically along the implant, potentially independent in pitch of other helical structures such as threads. Optionally, the cycles per rotation varies along the longitudinal extent of the cutaway (for example, forming a "wavy" cutaway region). In consideration of its potential advantage for providing a space for bone regrowth along a generally straight stretch of jawbone, a straight, rather than twisted or wavy surface, is typically preferred for the cutaway interior.

In some embodiments, a cutaway region is distinguishable by a periodic variation in the maximal radial position of the valley (deepest portion) of a thread relative to a longitudinal implant axis, wherein the number of cycles from "thinnest" to "thickest" is, for example, 1, 2, 3, more, or an intermediate value per rotation along the thread. Some embodiments of such a cutaway region are described, for example, in relation to FIGS. 11A-11C, hereinbelow.

Furthermore, a cutaway region, in some embodiments, is distinguished from a longitudinally extending notch region, such as a notch cut into an apical end of a dental implant to form a cutting edge (such a notch 540 is described, for example, in relation to FIGS. 5A-5C, hereinbelow). A notch is distinct from a cutaway region, for example, insofar as a notch comprises a longitudinally extending concavity, and in particular, a concavity extending around the circumference of the implant for less than, for example, 120°, 90°, 60°, 45°, or another intermediate or smaller angle. Nevertheless, it should be understood that in some embodiments of the invention, a cutaway comprises a relatively shallow concavity compared to the radial extent of the cutaway. For example, a cutaway region which intersects two points of the circumference of an implant-bounding cylinder of radius r at the intersection level, such that a chord of length l is defined between the points of intersection, optionally has a concavity depth of 1/3 l, 1/4 l, 1/5 l, 1/6 l, a lesser value, or any value in between.

Other Dimensions of a Dental Implant

In some embodiments of the invention, the length of a dental implant 100 (or another implant, for example as described in relation to FIGS. 3A-13, hereinbelow) is, for example, 6 mm, 8 mm, 10 mm, 11 mm, 11.5 mm, 12 mm, 13 mm, 15 mm, 16 mm, 17 mm, 18 mm, or another longer, shorter, or intermediate length. In some embodiments, the maximum diameter of a dental implant is, for example, 3.0 mm, 3.3 mm, 3.5 mm, 3.9 mm, 4.0 mm, 4.2 mm, 4.3 mm, 4.5 mm, 5.0 mm, 5.5 mm, 6.0 mm, or another greater, larger or intermediate maximum diameter. In some embodiments of the invention, the threading used for insertion and position maintenance of a dental implant comprises a sharp and/or truncated V-thread (isosceles thread). In some embodiments, the threading comprises a sharp and/or truncated buttress thread. Implant threading, in some embodiments, is provided at a pitch of between 0.5 and 3.0 mm, for example, 0.75 mm, 0.8 mm, 1.6 mm, 2.4 mm, or another greater, larger, or intermediate thread pitch. In some embodiments, the shape of the thread is variable, for example as described hereinabove and/or as shown in relation to the figures. In particular, thread depth varies, in some embodiments, as a function of a decreasing base width, and/or a varying degree of truncation at the thread edges.

In some embodiments of the invention, a dental implant comprises ridges, in place of threads, for providing insertion support. In some embodiments, the implant is fit to a prepared tooth socket by direct longitudinal force (for example, by hammering). Such embodiments are potentially of use in, for example, young jaw bone.

In some embodiments of the invention, threading pitch is variable, for example, between a crown module and an apical portion of a dental implant. Optionally, different threading pitches are chosen for different bone types, for example a shallower pitch for regions in contact with the harder cortical bone. In some embodiments, the threading pitch varies continuously along all or a portion of a dental implant. Potentially, extra stresses thus generated create additional stabilizing force for a bone implant. The maximum threading pitch difference between apical and coronal ends of a bone implant in some embodiments is, for example, 1%, 3%, 5%, or another greater, lesser or intermediate threading pitch difference.

Insertion and Positioning of a Dental Implant

Figure 1D:
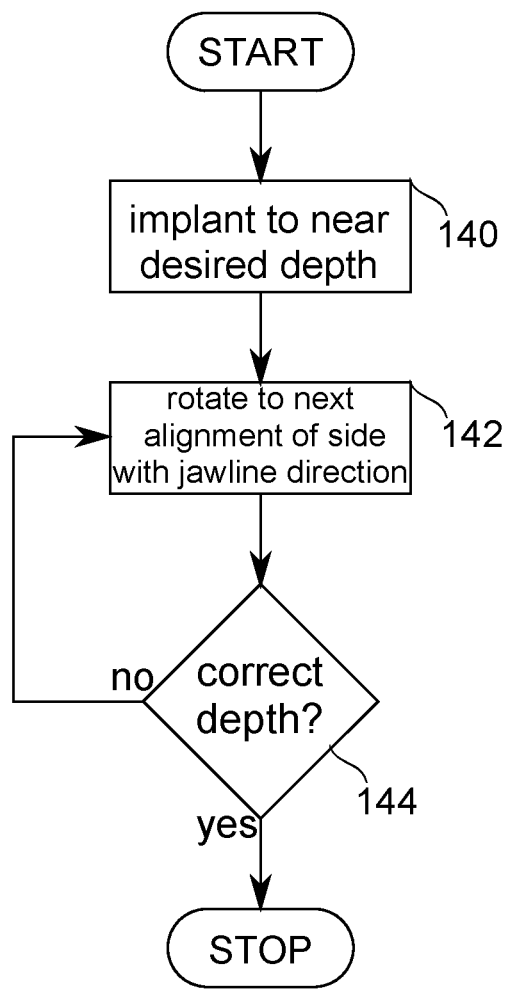
FIG. 1D is a flowchart summarizing positioning of an implant to a targeted rotational position and depth, according to some exemplary embodiments of the invention.

Reference is now made to FIG. 1D, which is a flowchart summarizing positioning of an implant to a targeted rotational position and depth, according to some exemplary embodiments of the invention.

At block 140, in some embodiments, the flowchart begins, and a dental implant is screwed into a prepared aveolus to approximately the planned implantation depth. In some embodiments of the invention, the planned implantation depth is flush with the existing bone line. In some embodiments, a portion of the dental implant (for example, 1-2 mm) is designed for protruding above the bone line, for example as described in relation to FIGS. 12A-13 hereinbelow.

At block 142, in some embodiments, the implant is rotated by an additional angle to align a cutaway region with a region of jawbone which is thin, for example, after aveolus preparation for the implant. A thin bone portion is potentially at risk for future degeneration unless it is given room to thicken. In some embodiments, the alignment of the cutaway region to a jawbone is determined by direct inspection of the implant. In some embodiments, the alignment of the cutaway region is determined by inspection of an insertion tool. The insertion tool (also referred to herein as a "positioning tool" or an "inserting tool") is keyed, in some embodiments, to mate with the dental implant only in one or more selected orientations. The insertion tool is optionally marked to indicate its orientation, and therefore to indicate also the orientation of the dental implant.

At block 144, in some embodiments, it is determined whether or not the dental implant is inserted to a proper depth, relative to the planned implantation depth. An acceptable tolerance of insertion used in the field of dental implantation is ±0.5 mm relative to a planned insertion depth. Optionally, the tolerance used is another value, for example, ±1 mm, ±0.25 mm, or another larger, smaller, or intermediate value. If the implant is found to be positioned within the target tolerance, then the flowchart ends. At this point, the dental implant is inserted into the jawbone within a tolerable distance of a targeted axial position within the aveolus, with a cutaway region positioned alongside a targeted region of thinned bone, for receiving potential future bone growth.

Otherwise, the flowchart returns to block 142. The minimal angle of rotation between steps depends, in some embodiments, on the number of cutaway regions provided around the perimeter of the dental implant. In some embodiments, the number of cutaway regions is, for example, 1, 2, 3 or a greater number of cutaway regions. Accordingly, the next rotation is, for example, 360°, 180°, or 120° for 1, 2 or 3 equally spaced regions, respectively.

Reference is now made to FIGS. 1E-1I, which illustrate axial and rotational positioning of a threaded dental implant 100 having a body with rough three-fold rotational symmetry about an apical-coronal axis, according to some exemplary embodiments of the invention.

The implant shown corresponds to the dental implant 100 of FIGS. 1A-1C, but similar principles apply to other embodiments of the invention, suitably adjusted for the geometry, and in particular, for the number of provided cutaway regions.

It is to be understood that "rough" N-fold rotational symmetry (for example, about an apical-coronal axis) describes a shape having N longitudinal cutaway regions positioned at constant relative angles around a body, while potentially disregarding certain details of shape including threading, grooving, and/or exact curvature. In general herein, where N-fold (for example, two-fold, or three-fold) rotational symmetry is described, the symmetry should be understood to be with respect to particular structures and/or features mentioned, such as cutaways, and indexed torque-receiving notches and/or polygons.

Furthermore, it is to be understood that the interactions of rotational position and axial position described with respect to N-fold rotational symmetry extend, suitably adjusted for changes in cutaway angles, to some embodiments of the invention having more substantially asymmetric arrangements of N faces. For example, in some embodiments of a three-cutaway implant, one face has a greater or shorter width (as viewed from along an apical-coronal axis) than the other two, and/or all faces have different widths, as so viewed. There are still three "aligned" positions in such an embodiment, albeit at irregular angular intervals.

In FIGS. 1E-1H, line 180 represents a target level of dental implant implantation, which in this instance is set to the top level of the neighboring cortical bone 190 (the "bone line"). Trabecular bone 192 and gingival tissue 194 are also shown. It should be noted that the implant is shown in full profile, while the bone is shown in cross-section.

Lines 181A-181D represent different axial insertion depths achievable in a particular implantation scenario in which the maximum axial offset (error) of the dental implant position is encountered. Line 181A represents the position of the top of an exemplary implant 100 having one of three cutaway regions 101A aligned with an adjacent thinned region 191 of jawbone portion 195.

Figures 1E, 1F:
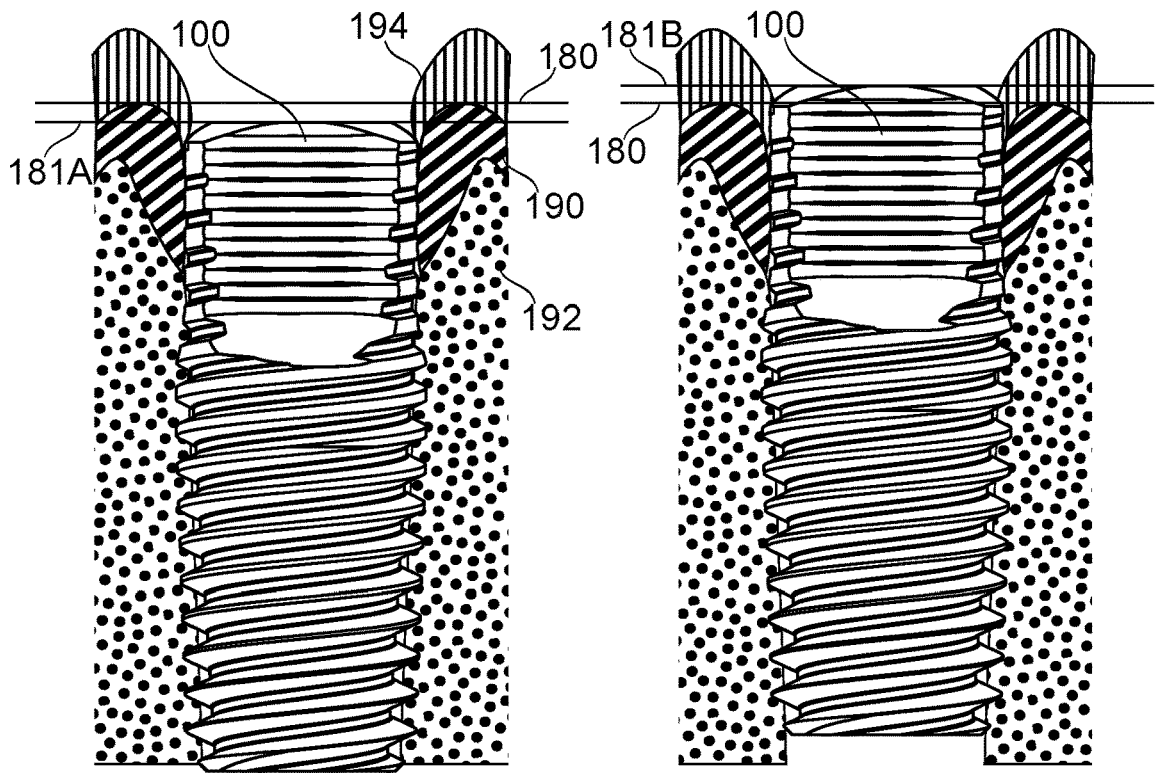
FIGS. 1E-1I illustrate axial and rotational positioning of a threaded dental implant having a body with rough three-fold rotational symmetry about an apical-coronal axis, according to some exemplary embodiments of the invention.
Figures 1G, 1H:
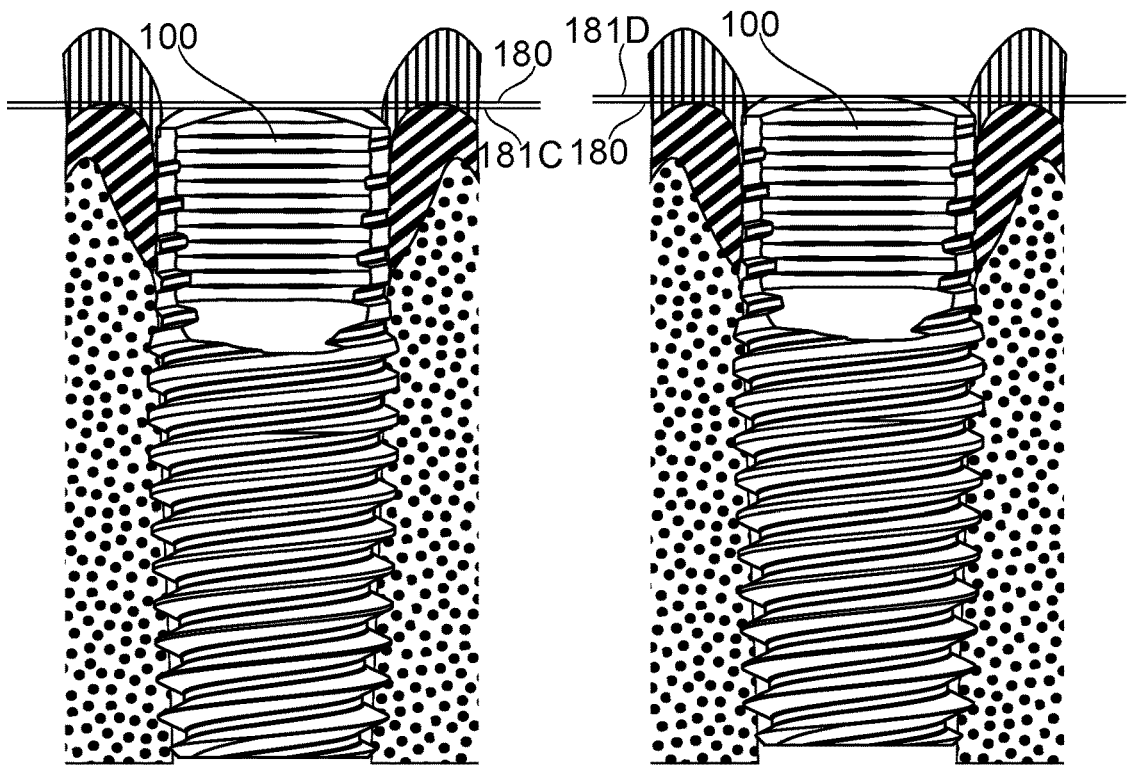
Figure 1I:
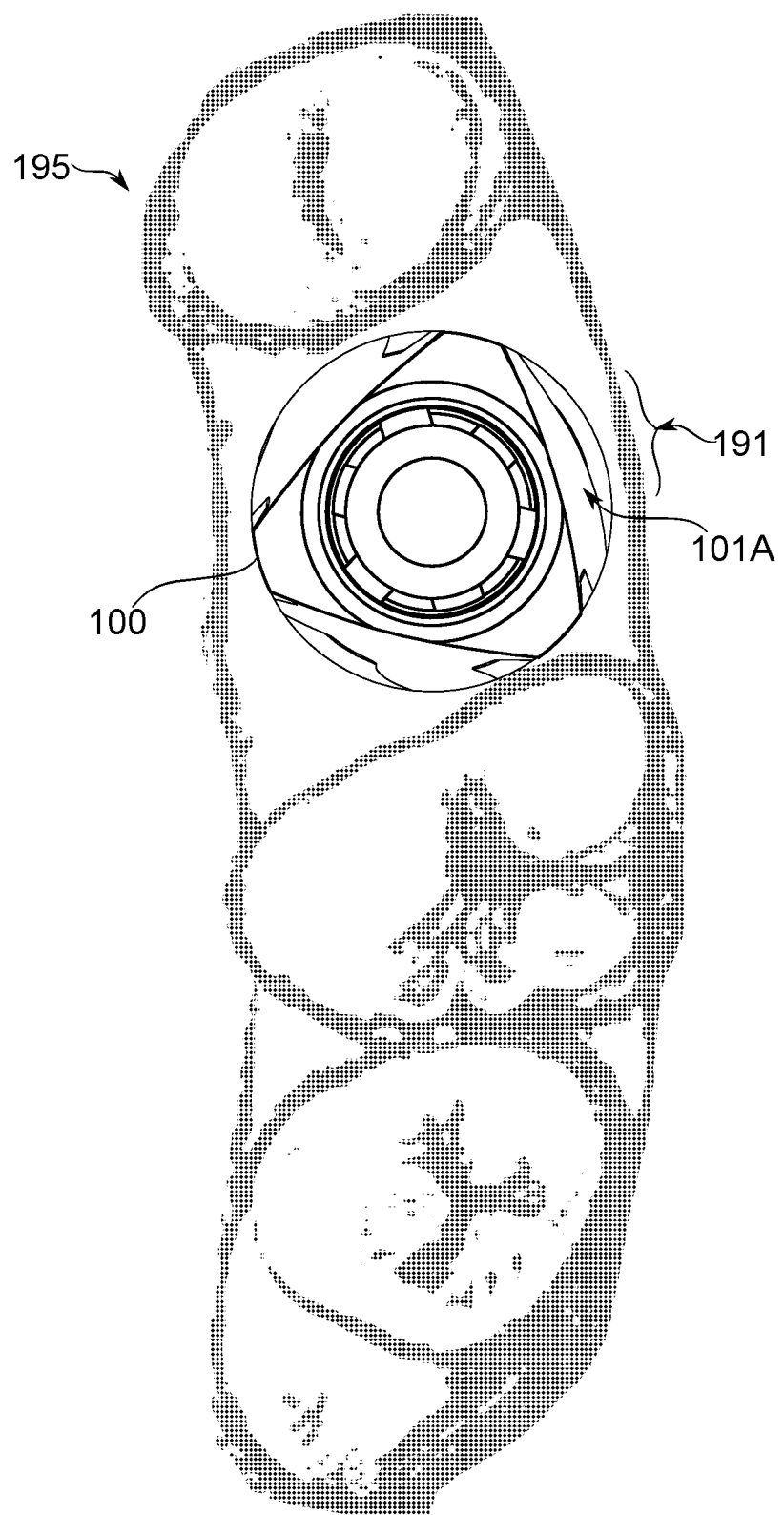

This is the configuration shown, for example, in FIG. 1I. The portion of jawbone 195 illustrated comprises four tooth positions of a maxillary bone, one of which is occupied by the implant. It should also be noted that the darker lines of implant 100 in FIG. 1I outline the coronal portion of the implant, while the lighter lines outline more deeply buried portions of the implant.

The error of the best-available positioning represented here is the maximum of ½ of a rotation for one of the cutaway regions. In FIG. 1E, the implant is ½ turn too deep when aligned to this cutaway region; in FIG. 1F, after one full turn, the implant is ½ turn too shallow. For a single cutaway region dental implant, these two positions are potentially sufficiently close to the planned position, depending on the thread pitch. A thread pitch of 1.0 mm or below, for example, ensures that the implant is within a ±0.5 mm tolerance at the closest available and jawbone-aligned position. However, with the provision of two additional cutaway regions in some embodiments, two closer positions are potentially available. FIG. 1G shows alignment of the jawbone to a second cutaway region, 120° away from the first, which reduces the difference between actual and target position to about ⅙ of the thread pitch. A third cutaway region (also 120° away from the first, but in the opposite direction), when optimally aligned, also aligns to within ⅙ of the thread pitch. Thus, the maximum acceptable thread pitch for a 3—cutaway region implant is potentially as much as 3.0 mm, if a ±0.5 mm tolerance is specified. Potentially, a larger thread pitch increases the speed with which insertion can occur, since fewer rotations of the implant are required to bring it to its target level. It should be noted also that with two cutaway regions spaced opposite one another, the implant is potentially positionable within a tolerance of ±0.25 thread pitches.

A potential advantage of an implant comprising three cutaway regions is that two of the sides can, in some instances, be positioned to simultaneously provide a space for bone regrowth both along the jawbone and along a bony septum separating two adjacent tooth sockets. For example, the implant 100 of FIG. 1I is positioned such that a gap (in superficial levels of the bone) is increased between the implant and the tooth position shown immediately above it.

Figure 1J:
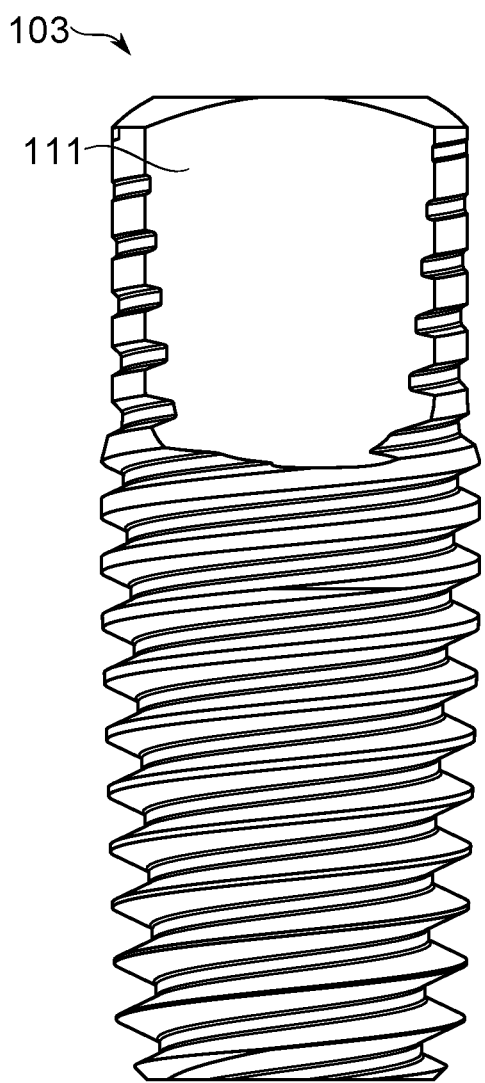
FIG. 1J illustrates a dental implant having a smooth-faced cutaway region, according to some exemplary embodiments of the invention.

Reference is now made to FIG. 1J, which illustrates a dental implant 103 having a smooth-faced cutaway region 111, according to some exemplary embodiments of the invention. In some embodiments of the invention, all or part of the surfaces created by a cutaway region are left smooth. This is a potential advantage for reducing plaque buildup on the implant.

Rotational Position Indexing

Reference is now made to FIGS. 2A-2D, which illustrate shape-keyed torque notches 150A, 150B positioned for alignment of side faces of a dental implant to a jawbone, according to some exemplary embodiments of the invention.

In some embodiments of the invention, an arrangement of torque notches 150A, 150B is configured to reflect corresponding positions of one or more cutaway regions 101. In some embodiments, each cutaway region 101 (or another surface feature) indicates a facing direction equivalently derived as for a facing direction indicated by each other cutaway region (or other surface feature). For example, the direction of a ray extending from the coronal-apical axis of the implant and passing through the center of the cutaway region defines an equivalent facing direction for each such cutaway region of an implant.

An insertion tool made for and mated to a particular notch configuration thus allows the orientation of cutaway regions to be determined from the orientation of the insertion tool itself. For example, each of the three deep notches 150B of FIG. 2A (shown in detail in expanded views of circled regions 201, 203, and 205, corresponding to FIGS. 2B, 2C, and 2D, respectively) leads the oriented position of a corresponding cutaway region 101 by about 30°. It is to be understood that the choice of leading angle and/or designation of the keying notch type is not limited to a particular angle or geometry, so long as a desired orientation of the implant is determinable by the position of a corresponding insertion tool.

In some embodiments of the invention, the number of torque notches provided is, for example, 4, 6, or 8 notches, or another larger, smaller, or intermediate number of torque notches.

In the embodiment illustrated, shallow notches are radially about 0.2 mm deep, while deep notches are radially about 0.3 mm deep. The notches shown are about 0.7 mm long around the perimeter of the bore hole 160 that they line. Potentially, the depth difference is sufficient to prevent insertion of a corresponding 0.3 mm protrusion provided on an insertion tool into a 0.2 mm torque notch, ensuring proper alignment to one of three insertion positions. Additionally or alternatively, notch positions are angularly offset around the borehole to create a keying pattern, for example by positioning one or more pairs of notches more closely to each other than the average position. In some embodiments, the keying feature comprises differences in notch length and/or longitudinal depth into the borehole. It is, however, a potential advantage to arrange the notches symmetrically, such that torquing force during implantation is more evenly distributed to the implant, reducing the risk of stripping the notches, and/or of uneven forces being exerted on the jawbone itself.

Figure 3A:
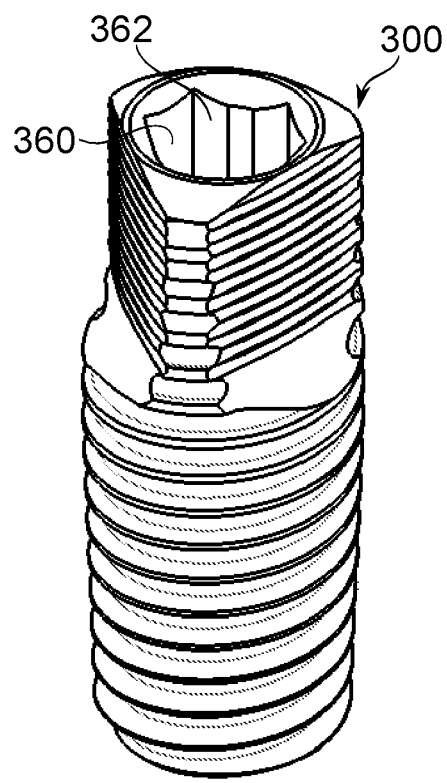
FIG. 3A illustrates a perspective view of a three-cutaway dental implant having a torque-receiving hexagonal-walled portion of the bore hole that receives an abutment, according to some exemplary embodiments of the invention.
Figure 3C:
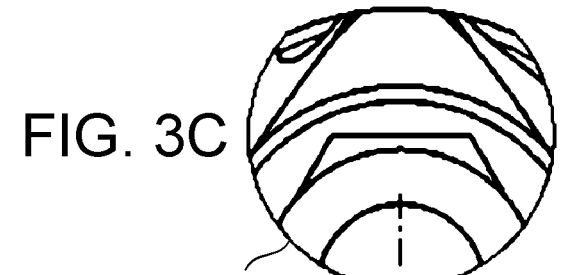
FIGS. 3B-3E illustrate top views of the hexagonal bore of FIG. 3A, according to some exemplary embodiments of the invention.
Figure 3B:
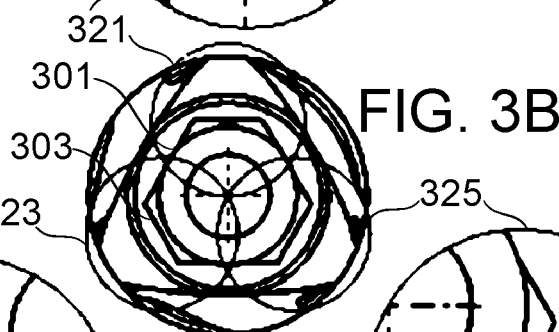
Figure 3D:
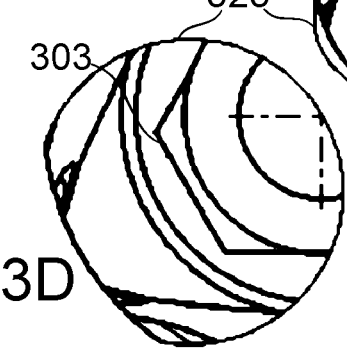
Figure 3E:
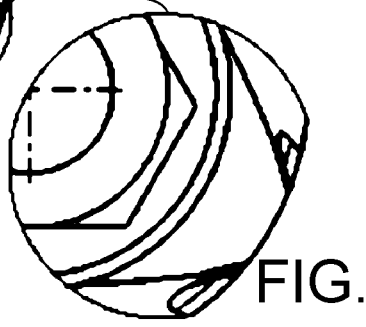

Reference is now made to FIG. 3A, which illustrates a perspective view of a three-cutaway dental implant 300 having a torque-receiving hexagonal-walled portion 362 of the bore hole 360 that receives an abutment, according to some exemplary embodiments of the invention. Reference is also made to FIGS. 3B-3E, which illustrate top views of the hexagonal bore 360 of FIG. 3A, according to some exemplary embodiments of the invention.

In some embodiments of the invention, another geometry provides the torque-receiving surfaces within the bore hole of the tooth implant. In some embodiments, a coronal portion of the borehole is shaped as a hexagon, or another polygonal shape (for example, a square, pentagon, slot or star), in order to receive and distribute torquing force during implant insertion.

In some embodiments of the invention, the polygonal shape is non-regular and/or comprises N-fold (but not greater) rotational symmetry reflecting corresponding N-fold rotational symmetry of implant cutaway regions. For example, in an exemplary three-cutaway region design, three of the hexagon walls 301, in some embodiments, are longer than the other three walls 303. The three short sides are shown in detail in expanded views of circled regions 321, 323, and 325, corresponding to FIGS. 3C, 3D, and 3E, respectively. In some embodiments, the non-regular hexagon is reflected in the inserting shape of a corresponding implant insertion tool. The keying ensures that the implant insertion tool attaches in one of three equivalent positions, such that the rotational position of the insertion tool indicates the position of the cutaway regions of the implant to which it is attached.

In some embodiments, the keying structure of a dental implant comprises coronally-facing projections and/or insets, positioned, for example, on a step internal to the receiving bore hole, and matched, in some embodiments, by apically-facing complementary insets and/or projections of a corresponding dental implant insertion tool.

Implant Positioning and/or Insertion Tool

Reference is now made to FIGS. 4A and 4C, which illustrate sectional side views of a dental implant 400 comprising an abutment-receiving bore hole having a receiving groove 470 for a complementary elastic mating element 413 (for example, a clip spring) of an implant insertion tool 410, according to some exemplary embodiments of the invention. FIG. 4C is a magnified view of region 411, showing detail of groove 470.

Reference is also made to FIGS. 4B and 4D, which illustrate side views of an implant insertion tool 410 having an elastic mating element 413 sized for insertion to the receiving groove of the implant 400 of FIG. 4A, according to some exemplary embodiments of the invention. FIG. 4D is a magnified view of region 412, showing detail of mating ring 413. In some embodiments of the invention, an insertion tool is provided as a part of a kit including one or more dental implants. In some embodiments, an insertion tool is provided as a separate accessory to a dental implant.

Figure 4E:
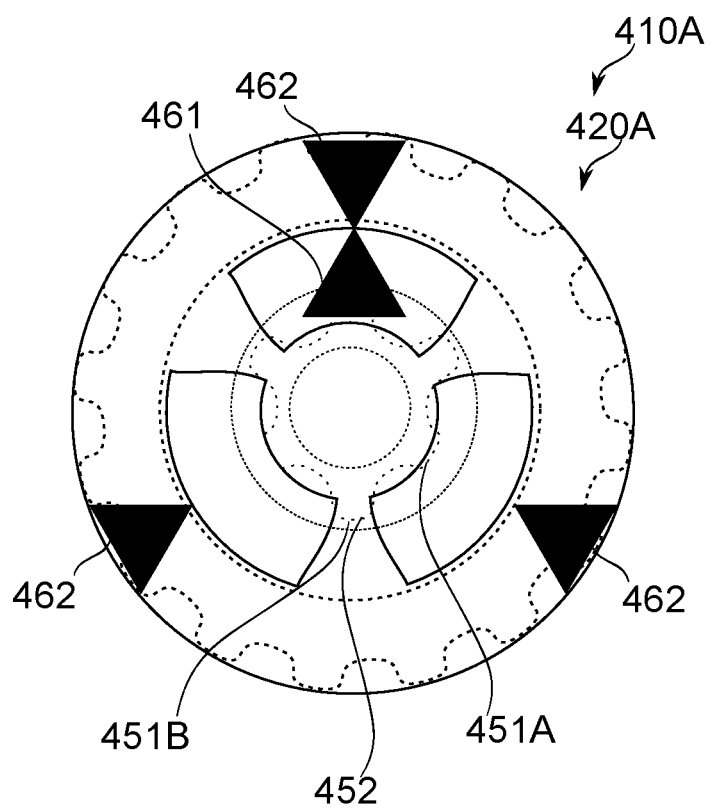
FIG. 4E illustrates an axial view of an implant positioning tool having split rotational position markers, according to some exemplary embodiments of the invention.
Figure 4F:
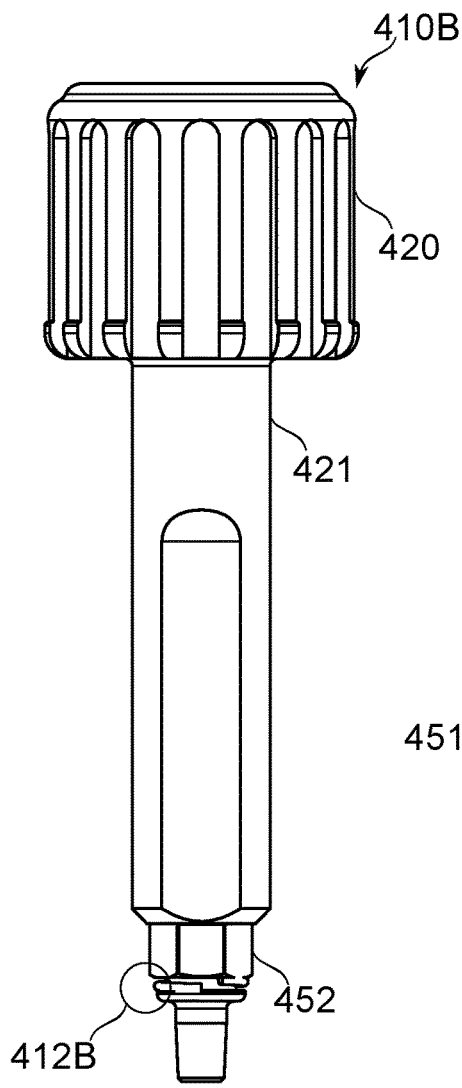
FIGS. 4F-4H illustrate side, expanded partial-axial, and expanded partial-side views, respectively, of an implant positioning tool having a keyed polygonal portion for inter-locking with a bone implant, and an elastic element sized for insertion to a holding depression of a bone implant, according to some exemplary embodiments of the invention.
Figure 4G:
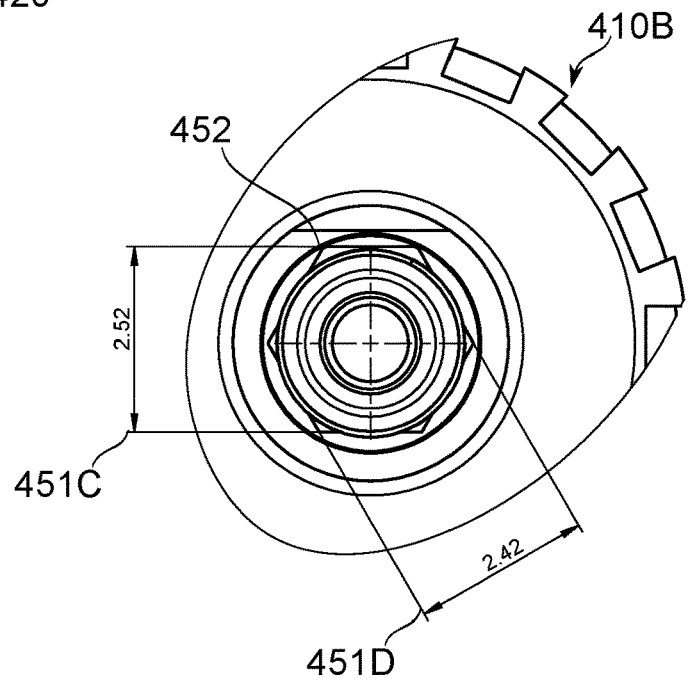
Figure 4H:
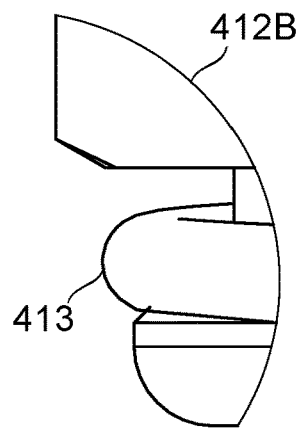

Further reference is made to FIGS. 4F-4H, which illustrate side, expanded partial-axial, and expanded partial-side views, respectively, of an implant positioning tool 410B having a keyed polygonal portion 452 for interlocking with a dental implant, and an elastic element 412B sized for insertion to a holding depression of a dental implant, according to some exemplary embodiments of the invention.

In some embodiments of the invention, groove 470 is a ring-shaped indentation sized and positioned so that the complementary elastic element (such as a clip spring) 413, mounted on implant insertion tool 410, snaps into it when correctly inserted into bore 460.

In some embodiments, the holding force of the tool-implant connection mechanism is sufficient to ensure that the implant insertion tool can be used to securely transfer the implant into the mouth of a patient, and then be used to screw the implant into a prepared tooth socket. In some embodiments, mating is reversible, however, such that a force applied for separation does not induce damage or dislocating stress on an inserted or partially inserted implant. In some embodiments, the force of insertion and/or separation is, for example, 1-3 Newtons, 2-5 Newtons, 5-10 Newtons or another range of forces having the same, intermediate, smaller and/or greater bounds. Additionally or alternatively, in some embodiments, the force of insertion and/or separation is, for example, 10-50 times the weight of the dental implant itself.

In some embodiments of the invention, insertion tool 410 comprises indexed teeth 451A, 451B, which are complementary in size, shape, and/or position to indexed torque notches 450A, 450B of dental implant 400 (or another dental implant comprising indexed torque notches, for example as described herein). In some embodiments, insertion tool 410B comprises a hexagonal or other polygonal insertion portion 452, complementary in size, shape and/or position to an indexing polygon shape, for example, an irregular hexagon, such as any of those described in connection with other dental implant embodiments herein.

In some embodiments of the invention, insertion tool 410, 410B is connected to a dental implant before implantation. During implantation, handle 420 is turned, imparting torque along shaft 421 to insertion element 452, teeth 451A, 451B, or another torque-imparting surface. In some embodiments of the invention, shaft 421 is about 20 mm long. In some embodiments, the length of the shaft is, for example, 5-10 mm, 8-16 mm, 10-20 mm, 15-25 mm, 20-30 mm or within another range of shaft lengths having the same, intermediate, larger and/or smaller range limits.

In some embodiments of the invention, the indexing/keyed shapes are positioned distal to the implant-retaining mechanism on an insertion tool. In some embodiments, the implant-retaining mechanism is distal to the indexing/keyed shapes, or is held on a level therewith.

In some embodiments both the receiving groove 470 and elastic mating element 413 are complete, or nearly complete (gapped) rings. An elastic mating element comprises, for example, a polymer gasket, and/or a wire spring ring. In some embodiments, the two structures occupy their respective perimeters only in selected mating regions, for example as complementary indentations and/or protrusions. In some embodiments, the dental implant comprises an elastic element, while the insertion tool comprises a complementary groove, additionally or alternatively to comprising an indentation in the implant body. In some embodiments of the invention, another mechanism is used to maintain a connection between a positioning holder and a dental implant, such as, for example, a holder mechanism that snaps over the dental implant, or a temporary adaptor screw that mates thereto.

In some embodiments, elements which provide a frictional and/or elastically-fitting secure connection between a dental implant and an implant positioning tool are located relative to structures involved in keyed orientation of the implant and implanting tool, such that the interactions of the keyed structures occur first, upon bringing the implant and tool together. In some embodiments, only once the keyed structures mate in a proper orientation can the implant and implanting tool be brought close enough together that the secure connection elements lock together.

In some embodiments of the invention, a more interior surface 471 of a receiving groove is flat, such that deeper insertion of the tool to the implant receives blunt resistance. In some embodiments, a more exterior surface 472 of a receiving groove is slanted, such that separation of tool and implant is eased by a gradual compression of elastic element 413.

In some embodiments of the invention, holder 410 comprises markings which indicate the relative rotational position of an attached dental implant 400 (or any other dental implant, for example, as described herein), and in particular, indicate the relative rotational positions of cutaway regions on the implant.

Reference is now made to FIG. 4E, which illustrates an axial view of the handle 420A of an implant insertion tool 410A having split rotational position markers, according to some exemplary embodiments of the invention.

In some embodiments of the invention, a portion of an implant insertion tool 410A bears an indicating marker 461, which is freely rotatable to indicate a preferred alignment direction of a dental implant. The portion of the tool to which the marker is attached is, for example, a cap portion affixed to a stem that is held in place while rotating the implant into position. In some embodiments, additional markers 462 are provided in a fixed relationship to a keyed portion of the tool 452 which inserts into a dental implant, for example carrying indexed teeth 451A, 451B. In some embodiments, the keyed portion 452 is shaped as a shape-keyed polygon, such as a hexagon, for insertion into a complementary shape-keyed polygon receiving bore. Keying of a polygonal insertion element 452, for example, comprises having distinct widths 451C, 451D (shown, for example, in FIG. 4G) across different side-perpendicular axes of polygon that the insertion element comprises.

As shown in FIG. 4E, the insertion tool is for a three-cutaway region dental implant. In some embodiments, markers are provided for another number of positions, for example, one, two, or more.

To operate implant insertion tool 410A, two markers (462, 461) are aligned, while holding a still-uninserted dental implant over a prepared alveolus in the desired orientation. After this, only the rotational position of the implant-locked portion is changed, as the implant itself is rotated. Thus, as insertion proceeds, each time two markers come into alignment, the dental implant is known to be in a target orientation.

In some embodiments, only the rotating markers are provided. The target orientation is determined, for example, by care in initial positioning, inspection and/or memory during insertion. In some embodiments of the invention, one or more markers comprise a superficial marking, for example, a color or shape. In some embodiments, one or markers comprise a scratch, carved out portion, bulge, or other deviation from a fully radially symmetric form.

Reference is now made to FIGS. 5A-5C, which respectively show perspective, side, and sectional side views of a dental implant 500 having a body with two longitudinal cutaway regions, according to some exemplary embodiments of the invention.

In some embodiments of the invention, two cutaway regions 501 are provided. In some embodiments, the two cutaway regions 501 are positioned directly opposite one another. A potential advantage of embodiments of the invention having two cutaway regions is that each defines a bone growth region for a different side of the implant running about parallel to the jawbone. Thus, thinned regions on either side of the implant can be accommodated.

In some embodiments of the invention, a notch 540 is provided, which potentially serves as a cutting tool which helps thread the implant into the bone as it is turned. It should be noted that the notch differs from a "cutaway", as described hereinabove, not only by its position, but also by the concavity and angling of its shape.

In some embodiments of the invention, indexing torque notches 550A, 550B are provided. The pattern of the torque notches is provided, in some embodiments, with a two-fold rotational symmetry, reflecting the rough two-fold rotational symmetry defined by the two cutaway regions 501.

Reference is now made to FIGS. 5D-5F, which illustrate shape-keyed torque notches 550A, 550B positioned for alignment of cutaway regions of a dental implant to a jawbone, according to some exemplary embodiments of the invention. FIG. 5D is a magnified view of region 521, while FIG. 5F is a magnified view of region 522.

In some embodiments of the invention, a two-fold rotational symmetry is enforced on the insertion of an insertion tool by making two opposite torque notches larger, with correspondingly larger fitting elements on an insertion tool designed to fit the notch pattern. As shown in FIGS. 5D-5F, the larger notches define an axis running along the direction of the cutaway regions. However, it can be readily understood that any relative orientation of notch pattern and cutaway region could be chosen, with suitable modification made to any markings or other indications of rotational position observable on the insertion tool.

Figure 6A:
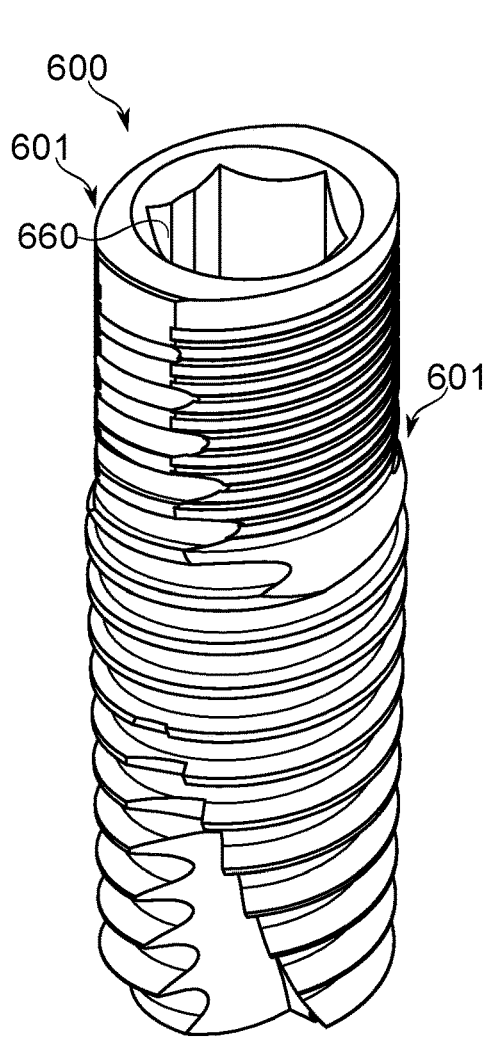
FIGS. 6A-6B, respectively, show perspective and side views of a dental implant having a body with two cutaway regions, and a keyed hexagonal bore for receiving a correspondingly shaped insertion tool, according to some exemplary embodiments of the invention.
Figure 6B:
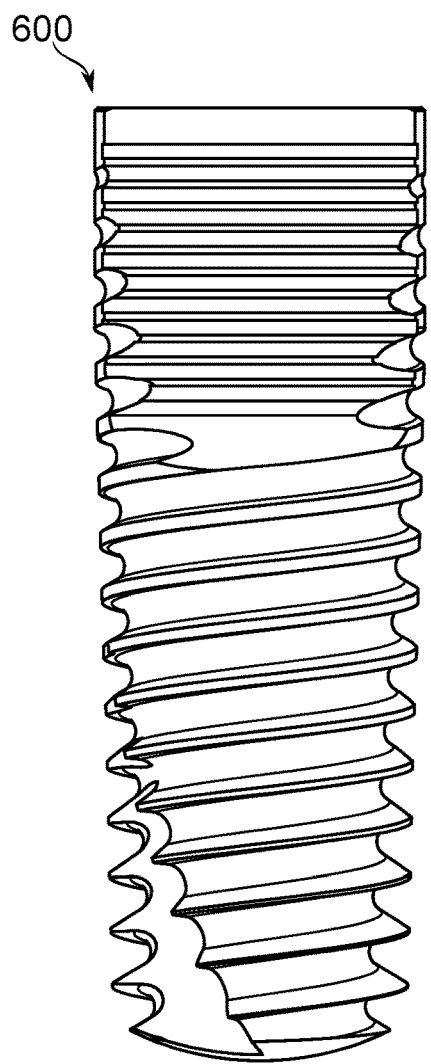
Figures 6C, 6D, 6E:
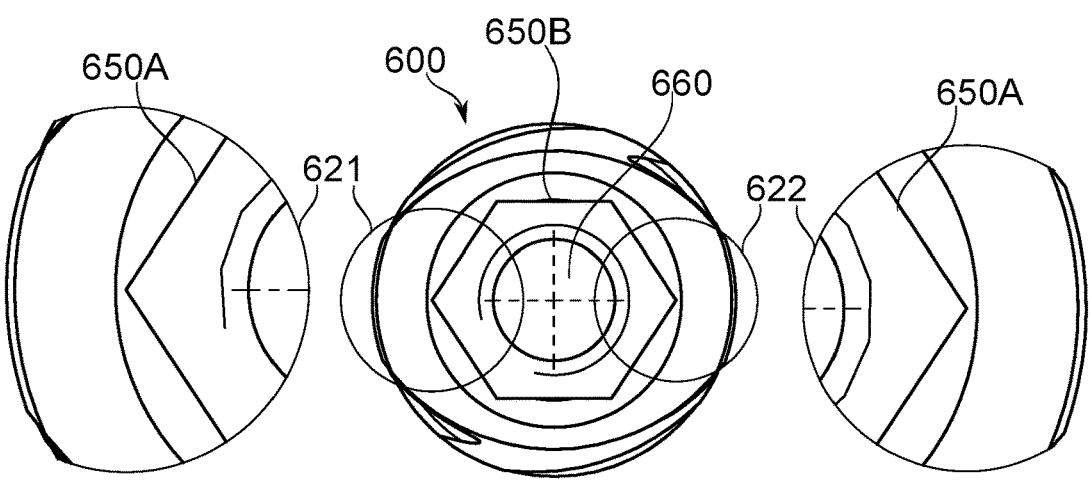
FIGS. 6C-6E illustrate a shape-keyed hexagon configured for alignment of cutaway regions of a dental implant to a jawbone, according to some exemplary embodiments of the invention.

Reference is now made to FIGS. 6A-6B, which respectively show perspective and side views of a dental implant having a body with two cutaway regions 601, and a keyed hexagonal bore 660 for receiving a correspondingly shaped insertion tool, according to some exemplary embodiments of the invention. Reference is also made to FIGS. 6C-6E, which illustrate a shape-keyed hexagon configured for alignment of cutaway regions of a dental implant to a jawbone, according to some exemplary embodiments of the invention. FIG. 6C is a magnified view of region 621, while FIG. 6E is a magnified view of region 622.

In some embodiments of the invention, a polygonal torque-receiving structure is provided to an implant having two cutaway regions, similar to that described hereinabove for three cutaway region implants, but adjusted for two-fold rotational symmetry. In the case of FIG. 6D, for example, polygon side 650B, and the side opposite it, are slightly lengthened relative to the other sides 650A. The result is a shape that will only accept a similarly formed mating tool in one of two orientations.

Figure 6F:
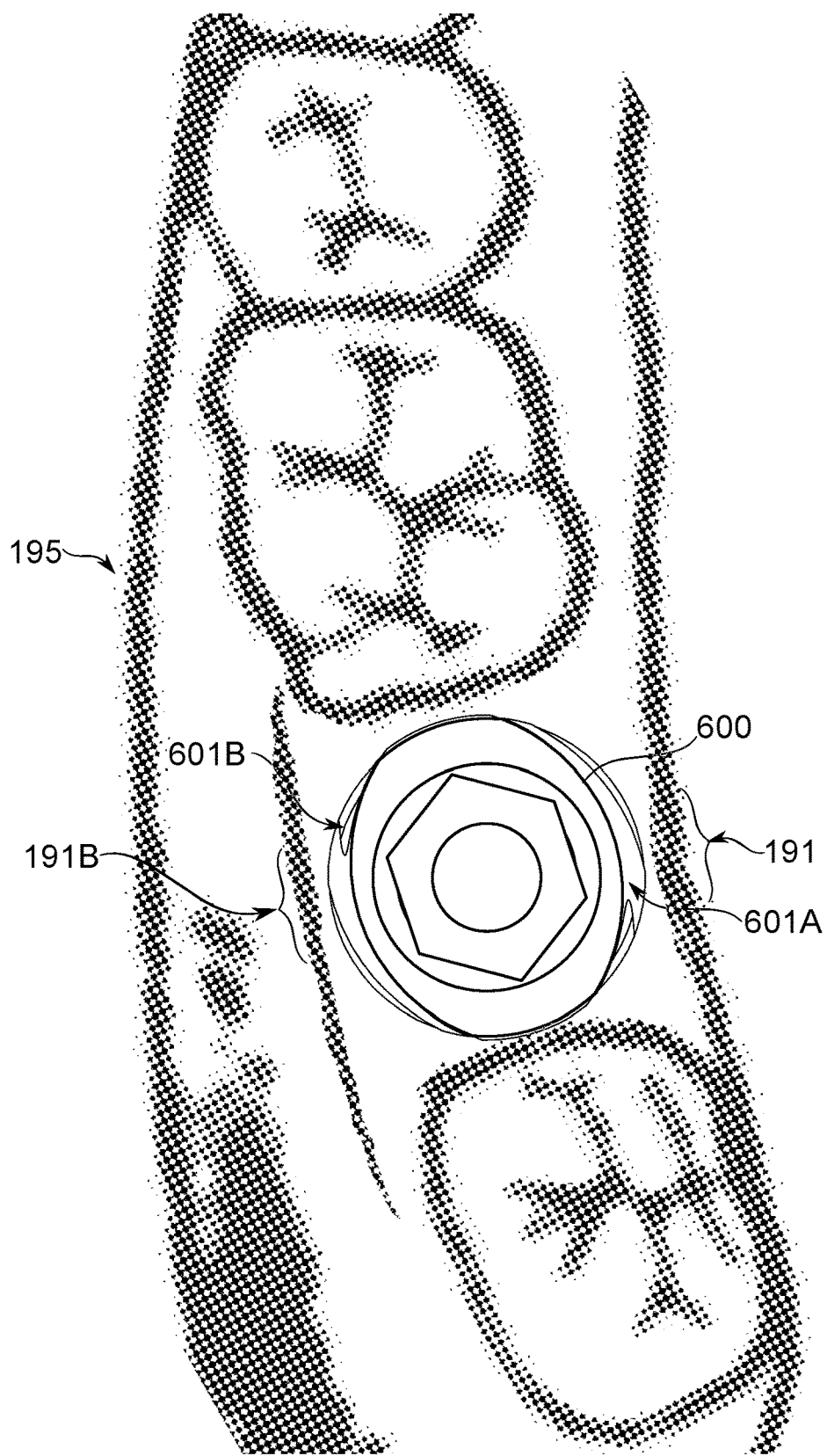
FIGS. 6F-6G illustrate rotational positioning of a threaded dental implant having a body with two cutaway regions, according to some exemplary embodiments of the invention.
Figure 6G:
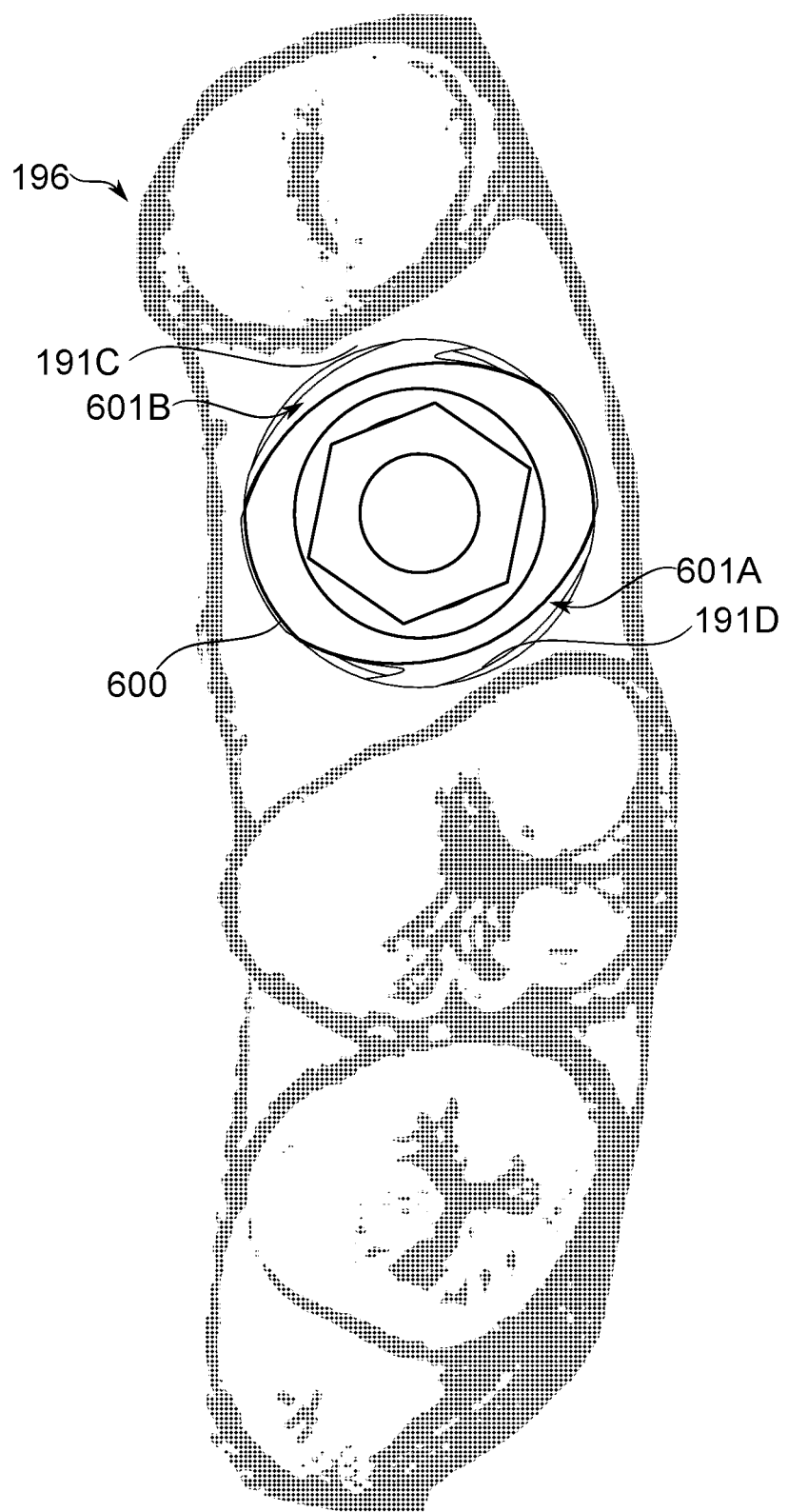

Reference is now made to FIGS. 6F-6G, which illustrate rotational positioning of a threaded dental implant having a body with two cutaway regions, according to some exemplary embodiments of the invention.

FIG. 6F illustrates positional properties of a dental implant 600 having two opposite cutaway regions 601A, 601B. The dark outlines of implant 600 represent the coronal portion of the implant, comprising the levels of the cutaway regions, while the lighter lines outline more apical portions of the implant. The difference in outline between the two represents space for potential bone regrowth gained from the cutaway. It can be seen that thin bone regions 191 and 191B receive a potentially large increase (for example, a doubling, relative to volume otherwise available) in self-support volume as a result of the two cutaway regions being present and properly aligned. Alignment in this example is to the lingual and buccal sides of the jawbone. The tooth replaced, in this instance, is a molar of the mandible.

FIG. 6G illustrates positional properties of a dental implant 600 having two opposite cutaway regions 601A, 601B, as implanted in a molar of the maxillary bone 196 (upper jaw). Here, thin bone regions 191C and 191D are interdental septa.

Reference is now made to FIGS. 7A-7C, which respectively show perspective and two orthogonal side views of a dental implant 700 having a body with a single cutaway region 701 extending along an apical-coronal axis, and a keyed set of torque-receiving notches 750A, 750B for receiving a correspondingly shaped insertion tool, according to some exemplary embodiments of the invention.

In some embodiments of the invention, one cutaway region 701 is provided. This provides a potential advantage by making space for bone regrowth relative to a fully circular implant. It can be seen in FIG. 7C that the cutaway region 701 can be characterized as comprising a single (curved) cut made parallel to the coronal-apical axis of the tooth implant. The depth of the material removed from within the rotationally swept envelope of the tooth implant changes according to level, since this envelope is monotonically tapering in shape from the coronal end toward the apical end of the implant.

Reference is now made to FIGS. 7D-7E, which illustrate shape-keyed torque notches 750A, 750B, configured for alignment of cutaway regions of a dental implant to a jawbone using an insertion tool, according to some exemplary embodiments of the invention. FIG. 7E is a magnified view of region 721, shown also in FIG. 7D.

In some embodiments of the invention, one torque-receiving notch is made differently (for example, enlarged) from the others, to allow a correspondingly changed mating part from an implant insertion tool to mate to a unique rotational position. When there is only one cutaway region 701, it is a potential advantage to allow an insertion tool to lock to the implant in only one position. This allows the position of the tool (if suitably marked) to indicate the position of the implant.

Figure 8A:
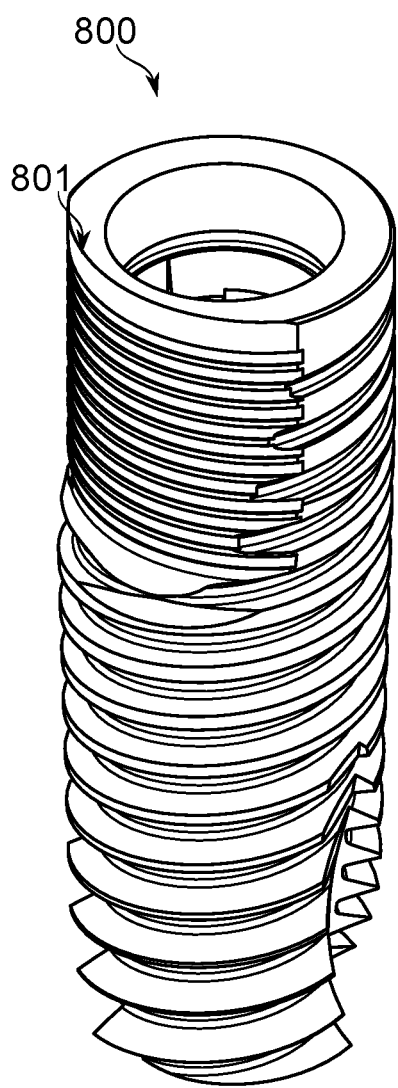
FIGS. 8A-8B respectively show perspective and sectional side views of a dental implant having a body with a single cutaway region extending along an apical-coronal axis, to terminate in a slanting shelf cut, and a keyed set of torque-receiving notches for receiving a correspondingly shaped insertion tool, according to some exemplary embodiments of the invention.
Figure 8B:
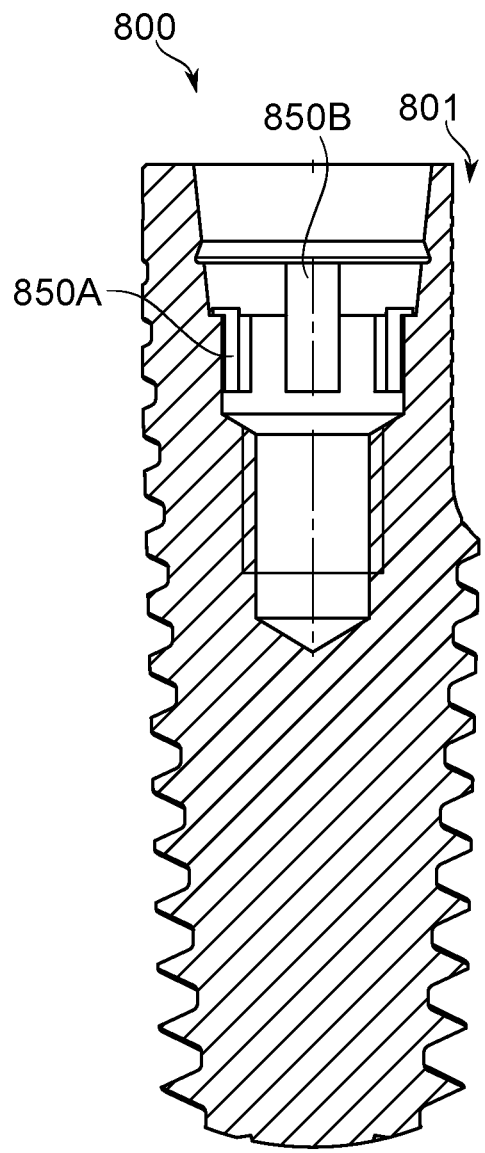
Figure 9A:
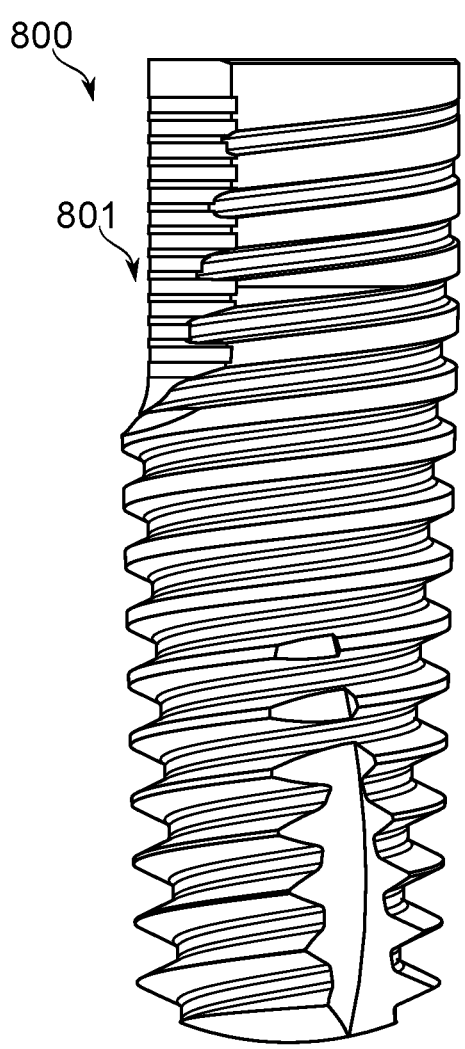
FIGS. 9A-9C show two orthogonal side views and an axial view of the dental implant of FIG. 8A, according to some exemplary embodiments of the invention.
Figure 9B:
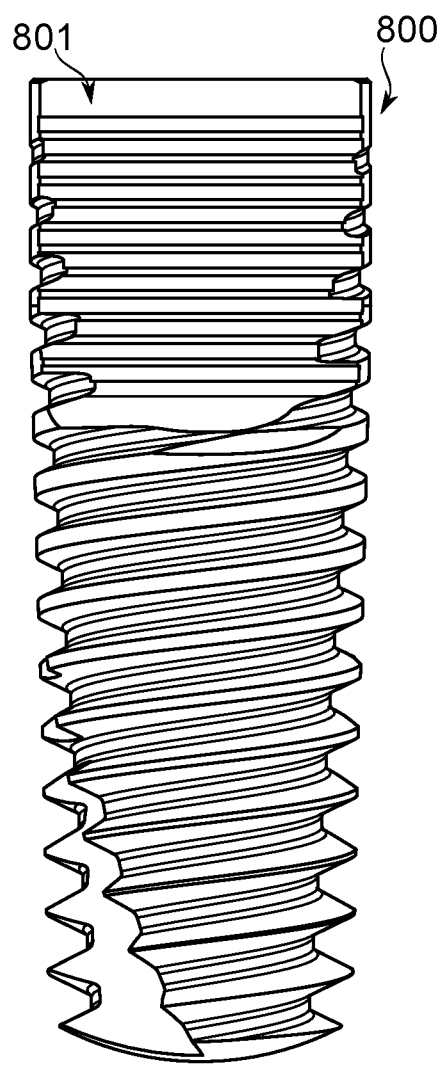
Figure 9C:
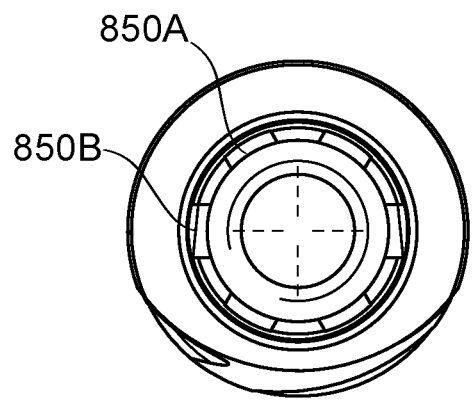

Reference is now made to FIGS. 8A-8B, which respectively show perspective and sectional side views of a dental implant 800 having a body with a single cutaway region 801 extending along an apical-coronal axis, to terminate in a slanting shelf cut, and a keyed set of torque-receiving notches 850A, 850B for receiving a correspondingly shaped insertion tool, according to some exemplary embodiments of the invention. Reference is also made to FIGS. 9A-9C, which show two orthogonal side views and an axial view of the dental implant of FIG. 8A, according to some exemplary embodiments of the invention.

The design of cutaway region 801 differs from that of region 701 in that it comprises a lower shelf, as previously described, for example, in relation to the three-cutaway embodiments of FIGS. 1A-1C. This potentially allows the deeper (more apical) portions of the implant to be wider, promoting stability, while preserving a volume for potential bone regrowth adjacent to coronal portions of the implant. Torque-receiving notches 850A, 850B are shown in positions that enforce a single attachment orientation. It should be noted that each of the two notches 850B has an internally variable depth, such that only one insertion tool orientation matches it.

Figure 9D:
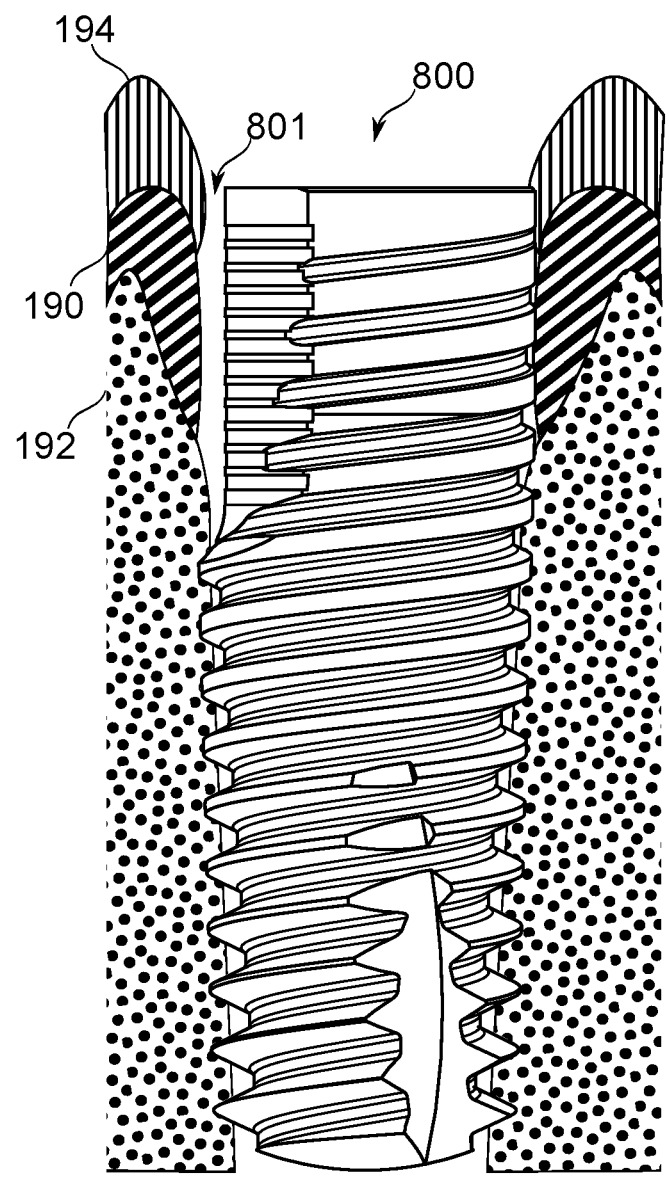
FIGS. 9D-9E show the dental implant of FIG. 8A implanted to a jaw bone before and after a period of bone remodeling, respectively, according to some exemplary embodiments of the invention.
Figure 9E:
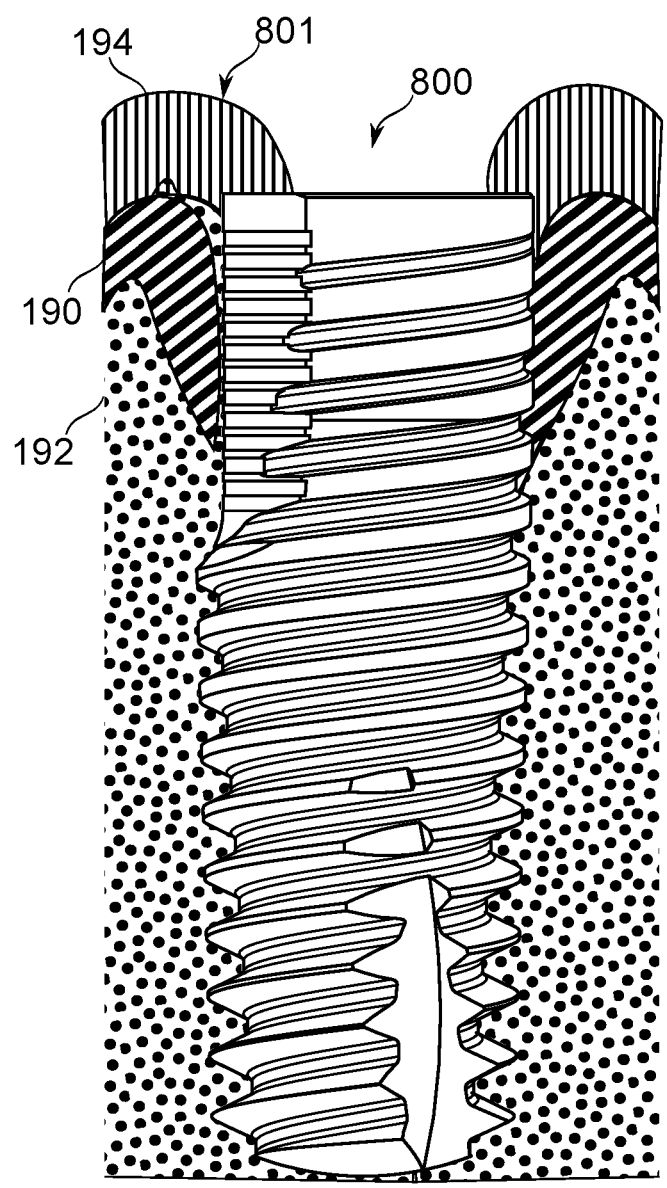

Reference is now made to FIGS. 9D-9E, which show the dental implant of FIG. 8A implanted to a jaw bone before and after a period of bone remodeling, respectively, according to some exemplary embodiments of the invention. It should be noted that the implant is shown in full profile, while the bone is shown in cross-section.

In some embodiments, a cutaway region 801 of a dental implant 800 is oriented to a region of thinned bone, for example as shown in FIG. 9D. Immediately after implantation, this leaves a gap which serves as a potential space for bone (190 and/or 192) to grow back into as the bone of the jaw remodels around the implant. FIG. 9E illustrates bone after regrowth. Cortical (190) and/or trabecular (192) bone has remodeled, for example in response to stresses experienced by the bone due to pressure from the implant. In particular, bone which might otherwise have been too thin to survive has instead expanded to fill the cutaway region 801. In some cases, gingival tissue 194 at least partially overgrows the implant surface as well.

Figure 9F:
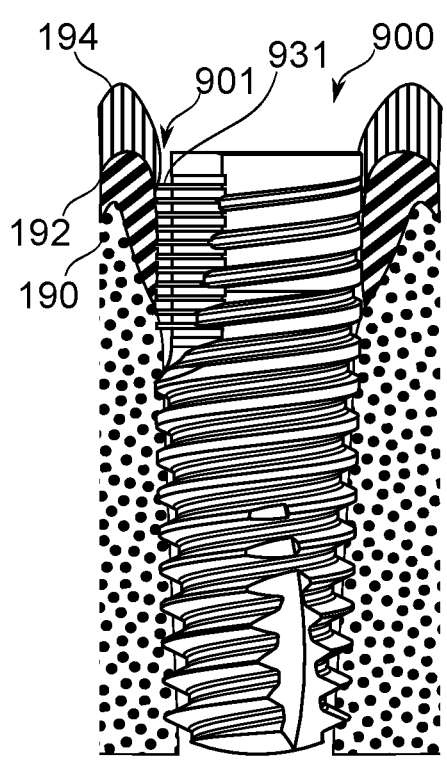
FIGS. 9F-9G show a dental implant having deep ridging along a cutaway portion thereof, implanted to a jaw bone before and after a period of bone remodeling, respectively, according to some exemplary embodiments of the invention.
Figure 9G:
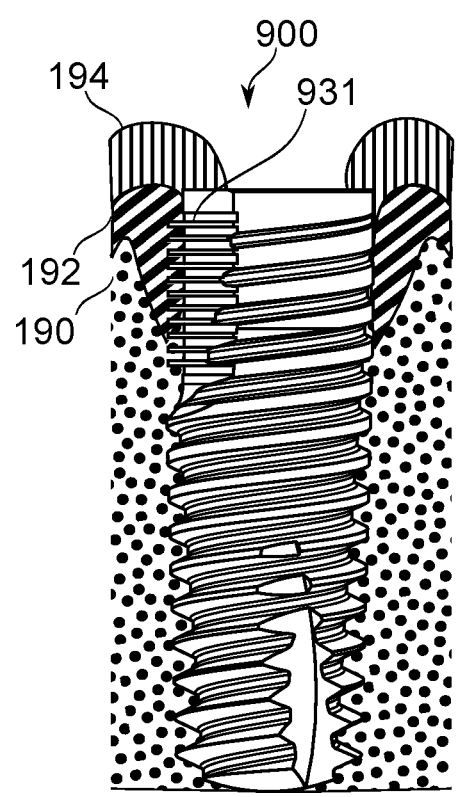

Reference is now made to FIGS. 9F-9G, which show a dental implant 900 having deep ridging 931 along a cutaway portion 901 thereof, implanted to a jaw bone before and after a period of bone remodeling, respectively, according to some exemplary embodiments of the invention.

In some embodiments of the invention, a cutaway region is provided with deep ridging 931, or another protruding feature or set of features. The protruding features are configured such that a portion of the volume 901 provided by the cutaway for receiving bone regrowth is occupied by structure which comes into contact with bone as it regrows, but does not initially serve to anchor the implant to the bone. A potential advantage of an initially non-anchoring protrusion is to exert sufficient stress on a regrowing bone portion to overcome a tendency for disuse atrophy, while maintaining that stress (particularly in an early period after implantation) below a level which could lead to loss of a bone portion while it is thin and vulnerable. Potentially, the avoided loss of a thinned bone portion is loss due to mechanical damage, for example by fracture and/or ablation, and/or loss due to biological damage, for example, due to lack of perfusion.

In some embodiments of the invention, the space left between protrusions allows thinned bone growing into it to be strengthened enough to be rescued from degenerative loss. The percentage of protrusion volume relative to overall cutaway volume, in some embodiments, is, for example, within the range of 10%-20%, 15%-40%, 40%-60%, or within another range having the same, intermediate, higher and/or lower bounds. In some embodiments, non-anchoring protruding features in a cutaway region comprise linearly extended features (ridges), of any suitable profile such as rectangular, rounded, and/or triangular. In some embodiments, protruding features comprise mound-like features, for example, protruding spikes, cylinders, and/or prisms.

In some embodiments, protruding features comprise sharp corners, potentially enhancing localized stress where encountered by bone. Additionally or alternatively, protruding features are rounded, potentially distributing stress more evenly around the protrusion. In some embodiments, protrusions extend across a cutaway region to the edge of a bounding envelope closely related to the overall shape of the implant, for example, a volume swept out by rotation of the implant. In some embodiments, protrusions extend across up to 90% of the cutaway region. In some embodiments, the extension is across up to 50%, 60%, 80%, or another larger, smaller, or intermediate fraction of the extent of the cutaway region. In some embodiments of the invention, initially non-anchoring protrusions from a cutaway region protrude sufficiently such that the protrusions themselves define the outer limits of an implant. Such "long" protrusions potentially come immediately into stressing contact with bone upon implantation, but make this contact in such a manner that higher forces exerted on the implant (particularly axial forces, for example, due to chewing) are not transferred to vulnerable bone portions until they have added strength by regrowth.

In some embodiments of the invention, the initial separation between bone locations and the locally nearest surface of a cutaway region is variable over the extent of the cutaway region. Additionally or alternatively, the cutaway region is shaped to protrude more or less across its extent to provide a gradient of laterally (radially) acting stress where it interacts with bone upon implantation. In particular, such a gradient arises, in some embodiments, in the regions where the longitudinally extending sides of a cutaway region intersect with the outer perimeter of the dental implant which contacts bone upon implantation.

Potentially, upon initial implantation, such variations in width ensure the formation of one or more "sweet spot" regions of stress interaction between a cutaway region of a dental implant and the bone adjacent to it. Such regions comprise enough stress exerted on bone to prevent disuse atrophy, while limiting stress to below potentially damaging levels. Potentially, the bone comprising such regions expands during bone remodeling, coming thereby into closer contact with additional regions of the dental implant. This in turn potentially spreads the gradient of stress further, and/or expands the "sweet spot". This closer contact in turn potentially stimulates further regrowth, leading to a virtuous cycle promoting the regrowth of healthy bone in the region of the implant.

It should be noted that the just described bone regrowth scenario provides an illustration of a potential advantage for a crown region of an implant which comprises cutaway regions which extend to a perimeter of the implant wide enough for bone contact. Mere reduction of the entire dental implant perimeter at the level of the sub-bone line crown, in contrast, potentially reduces stress everywhere around the implant crown to zero, whereby stimulation by the implant of bone regrowth would be lost.

Figure 10A:
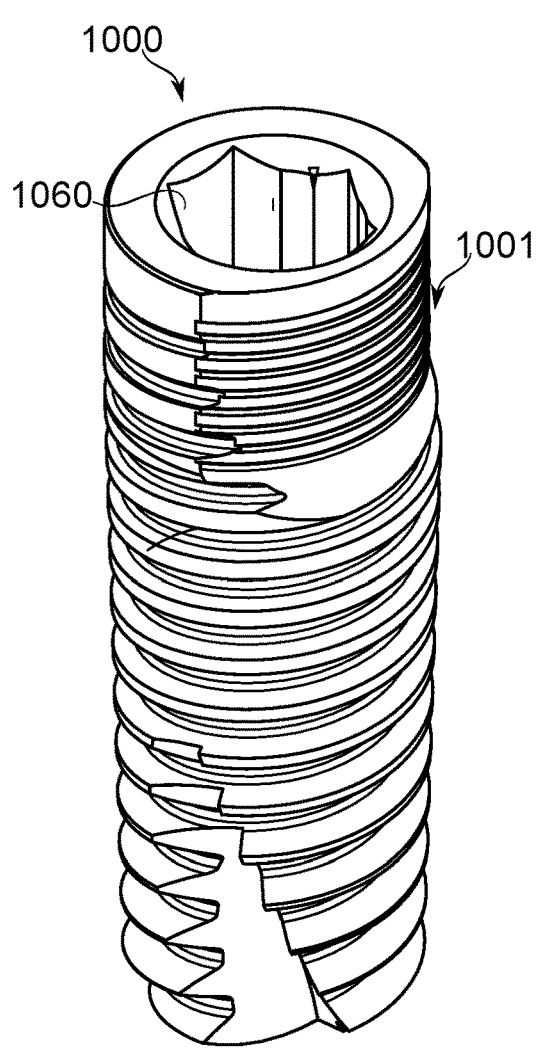
FIGS. 10A-10B show perspective and side views, respectively, of a dental implant having a single longitudinally extending cutaway region and a keyed hexagonal bore for receiving a correspondingly shaped insertion tool, according to some exemplary embodiments of the invention.
Figure 10B:
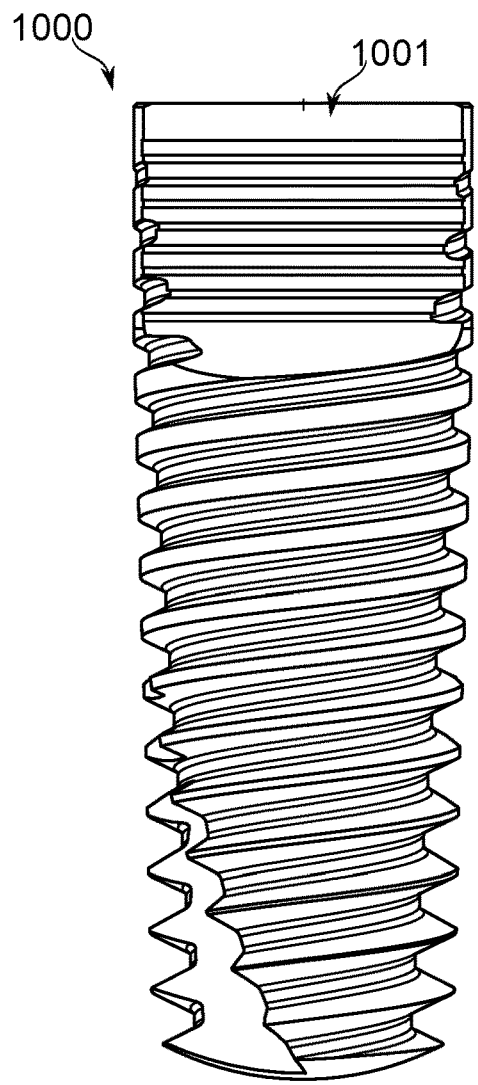
Figure 10C:
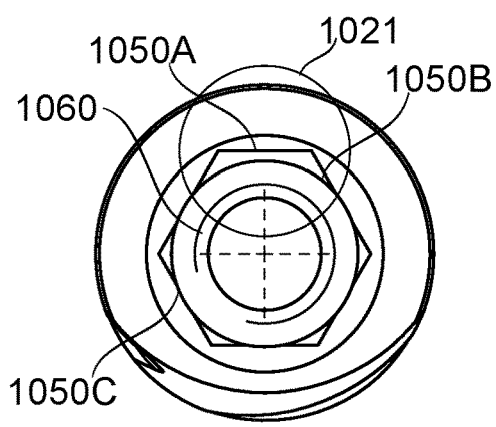
FIGS. 10C-10D show axial views of the dental implant of FIG. 10A, according to some exemplary embodiments of the invention.
Figure 10D:
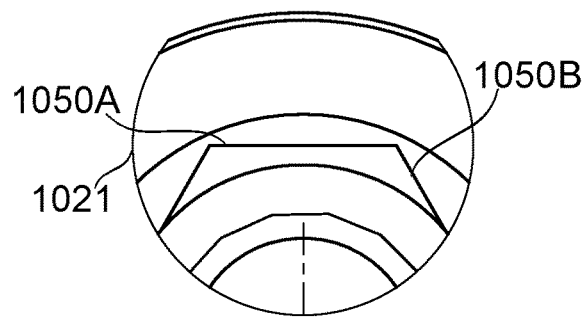

Reference is now made to FIGS. 10A-10B, which show perspective and side views, respectively, of a dental implant 1000 having a single longitudinally extending cutaway region 1001 and a keyed hexagonal bore 1060 for receiving a correspondingly shaped insertion tool, according to some exemplary embodiments of the invention. Reference is also made to FIGS. 10C-10D, which show axial views of the dental implant of FIG. 10A, according to some exemplary embodiments of the invention. FIG. 10D is an expanded view of region 1021 of FIG. 10C.

In some embodiments of the invention, the keyed polygon type of torque-receiving surface is adapted to provide a single preferred mating orientation of an insertion tool and a dental implant having a single cutaway region. Polygon side 1050A is shortened relative to sides 1050C, while sides 1050B which it connects to are correspondingly lengthened.

With respect to all of the herein-described keying/orienting features of different embodiments of the present invention, it should be noted that the provided functionality for determining an orientation of a dental implant relative to a position of an insertion tool is of general applicability to any implant feature which has one or more preferred orientations, for example, to orienting a coronal region which projects to a radially variable height relative to bone level.

Figure 11A:
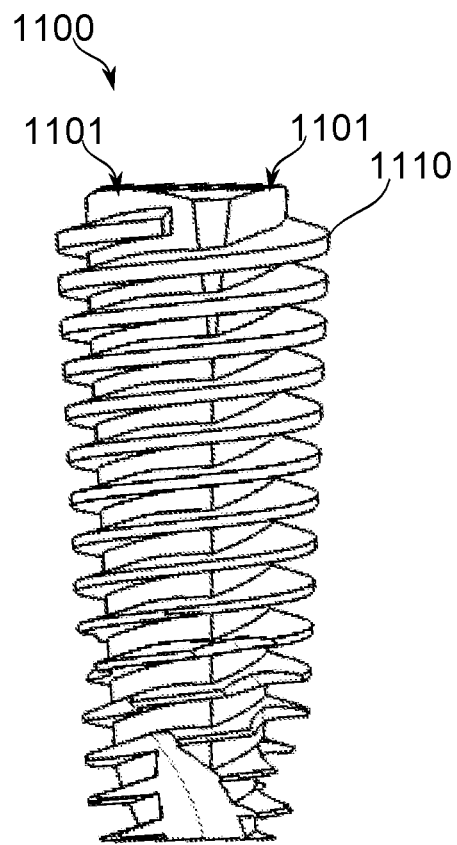
FIGS. 11A-11C show two orthogonal side views and an axial view of a dental implant comprising a triangular core wrapped by circular threads, according to some exemplary embodiments of the invention.
Figure 11B:
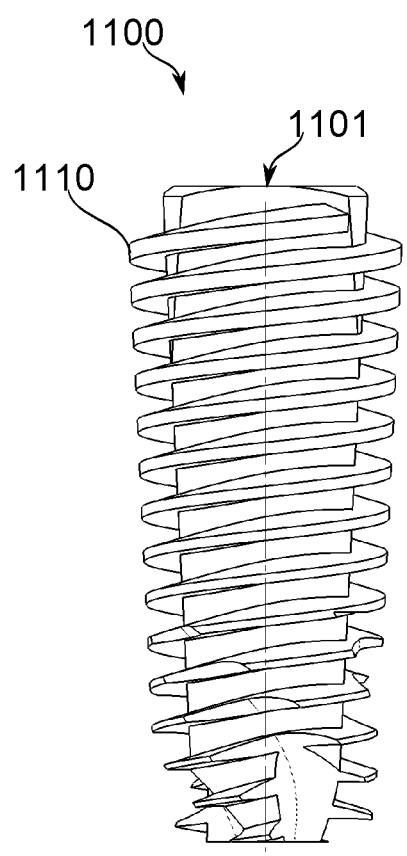
Figure 11C:
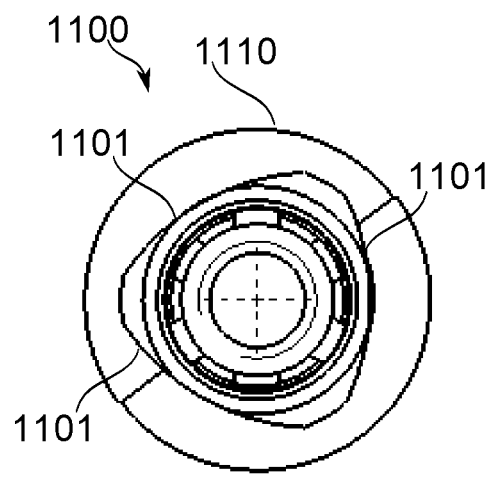

Reference is now made to FIGS. 11A-11C, which show two orthogonal side views and an axial view of a dental implant 1100 comprising a triangular core wrapped by circular threads 1110, according to some exemplary embodiments of the invention.

In some embodiments of the invention, a core volume of a dental implant 1100 comprises a region approximating a tapered triangular prism. The core volume is defined, for example, by surfaces 1101 of the implant. Around this volume, in some embodiments, wraps a deep circular thread, wherein the thread extends from the triangular volume by up to about ⅓, ½ or another greater, lesser, or intermediate extent of the overall radius of the implant—while the implant itself retains the same overall dimensions of a standard dental implant, as detailed hereinabove. In some embodiments of the invention, the thread defines a cylindrical surface (excluding 1 mm, 2 mm, 3 mm, 4 mm, 5 mm, more, less or an intermediate amount of the apical tip), the cylindrical surface having tapering (optionally, non-monotonic tapering) relative to its maximum diameter of up to 0%, up to 10%, up to 20%, up to 30%, up to 40%, up to 50%, and or up to another greater, lesser, or intermediate fraction of the maximum diameter of the implant.

It is a potential advantage to provide deep threads for a dental implant, as this extends the surface area over which bone compression stresses are distributed. Potentially, implant stability is increased due to fixation of the central core, which is not free to rotate without an increased pressure exerted by surrounding material (for example, clotting blood and/or infilling bone). Another potential advantage for the implant is that the regions of greatest static pressure are limited to the corners of the triangular core portion.

In some embodiments of the invention, the core cross section is different at different longitudinal positions along the implant, for example, by tapering and/or step-changes of maximum diameter, and/or by changing shape (for example to a circular or other cross-sectional shape).

In some embodiments of the invention, a shaped-core implant such at dental implant 1100 is provided with a keyed insertion region, such as a polygonal region or set of keyed torque-receiving notches.

The deep, flat surfaces of some embodiments like dental implant 1100 are potentially difficult to manufacture by a subtractive process, such as milling. However, casting, and/or or an additive process such as 3-D printing (assuming appropriate 3-D printing materials become available for use) are contemplated as manufacturing methods for some embodiments of the invention.

Figure 12A:
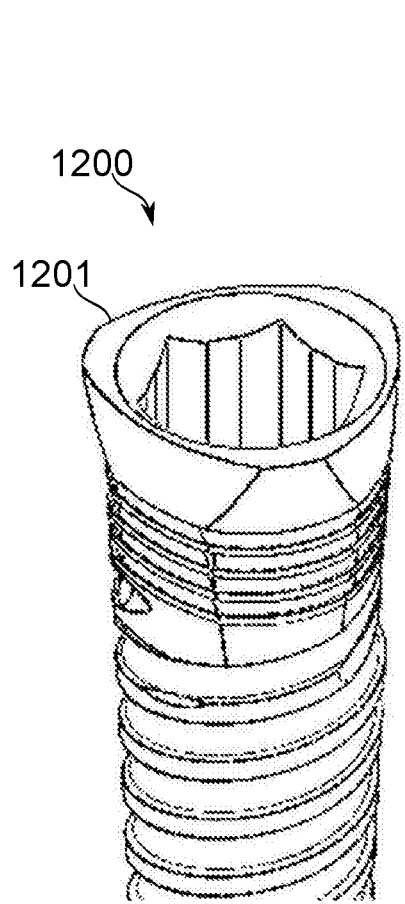
FIGS. 12A-12C show perspective, side, and axial views, respectively, of a dental implant comprising a smooth trans-mucosal region having three-fold rotational symmetry, and sized to protrude past a bone line, according to some exemplary embodiments of the invention.
Figure 12B:
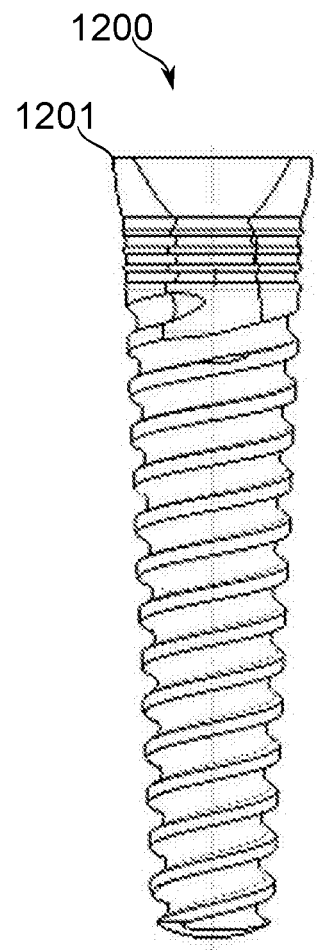
Figure 12C:
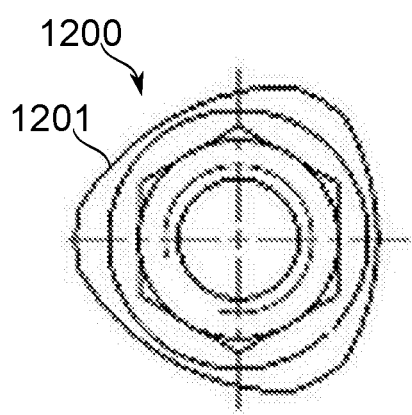
Figures 12D, 12E:
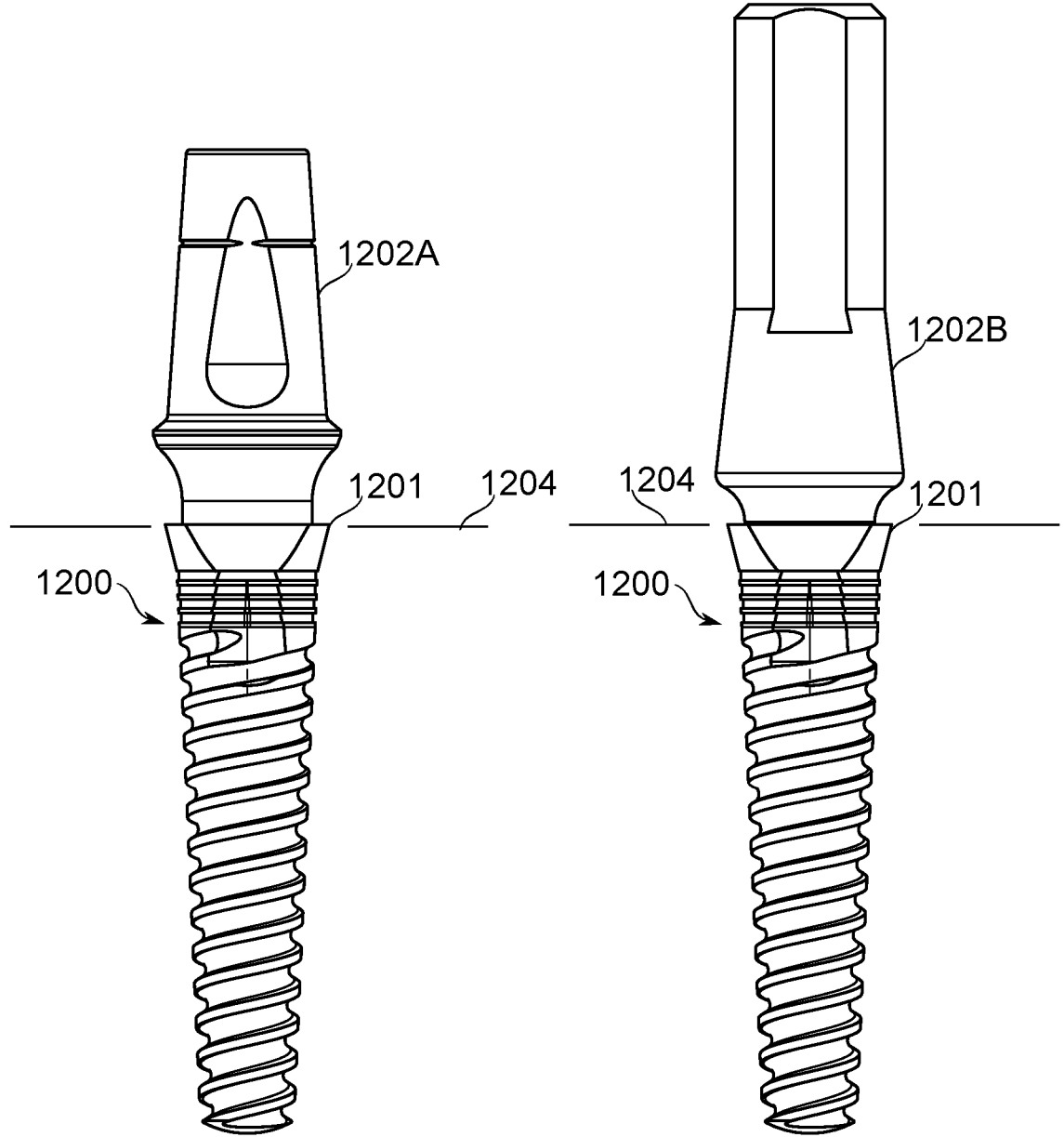
FIGS. 12D-12E show the dental implant of FIG. 12B connected to two different types of abutment, according to some exemplary embodiments of the invention.
Figures 12F, 12G:
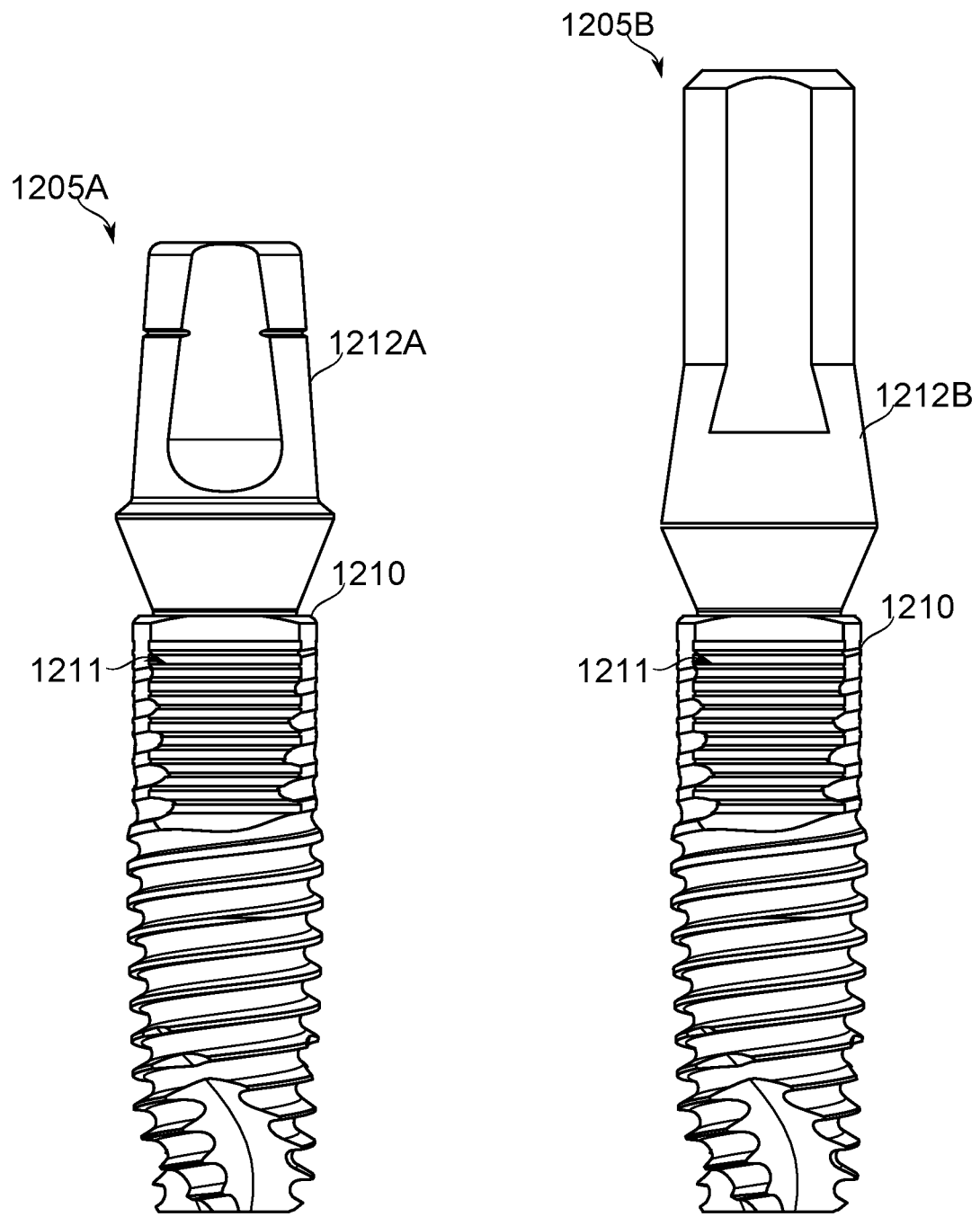
FIGS. 12F-12G show one-piece dental implant and abutment designs having cutaway regions, as well as integrated abutment pieces, according to some exemplary embodiments of the invention.
Figure 12H:
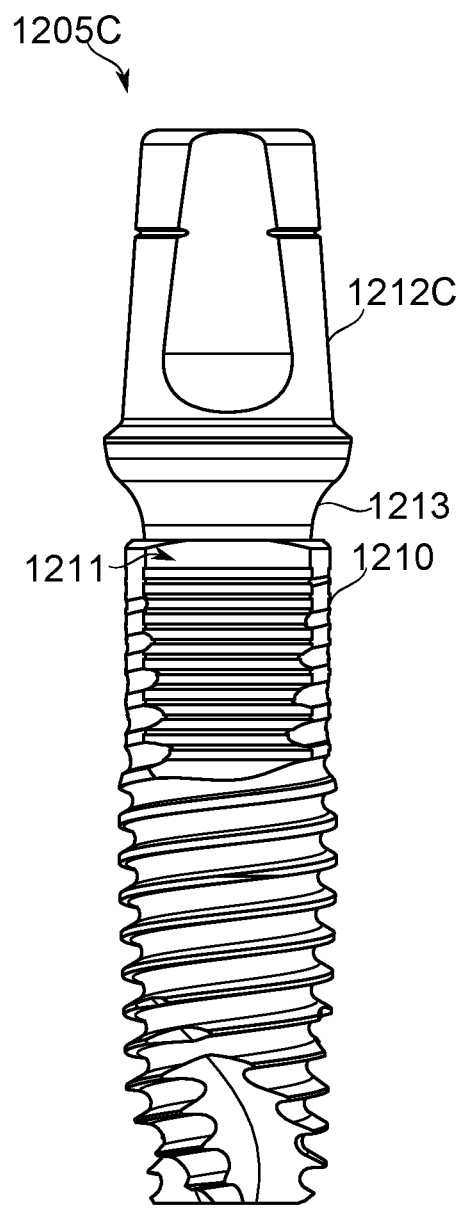
FIG. 12H illustrates a one-piece dental implant and abutment having cutaway regions, as well as an integrated abutment piece comprising concave regions at the base, according to some exemplary embodiments of the invention.

Reference is now made to FIGS. 12A-12C, which show perspective, side, and axial views respectively of a dental implant 1200 comprising a smooth trans-mucosal region 1201 having three-fold rotational symmetry, sized to protrude past a bone line, according to some exemplary embodiments of the invention. Reference is also made to FIGS. 12D-12E, which show dental implant 1200 connected to two different types of abutment 1202A, 1202B, according to some exemplary embodiments of the invention. Reference is further made to FIGS. 12F-12G, which show one-piece dental implant-abutments 1205A, 1205B having cutaway regions 1211, as well as integrated abutment pieces 1212A, 1212B, according to some exemplary embodiments of the invention. Reference is also made to FIG. 12H, which illustrates a one-piece dental implant-abutment 1205C having cutaway regions 1211, as well as an integrated abutment piece 1212C comprising concave regions 1213 at the abutment base, according to some exemplary embodiments of the invention.

Figure 13:
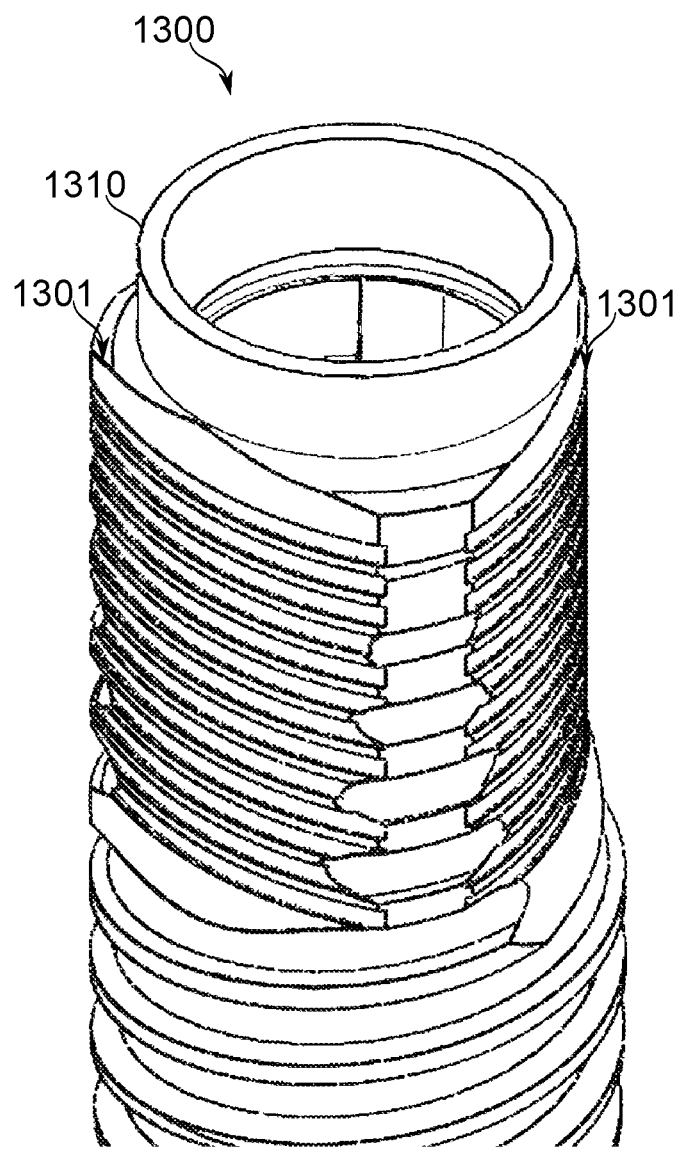
FIG. 13 shows a perspective view of a dental implant comprising a smooth, cylindrical trans-mucosal region sized to protrude past a bone line, according to some exemplary embodiments of the invention.

Reference is also now made to FIG. 13, which shows a perspective view of a dental implant 1300 comprising a smooth, cylindrical trans-mucosal region 1310 sized to protrude past a bone line, according to some exemplary embodiments of the invention. It should be noted that some embodiments shown, such as those of FIGS. 12A-12C, are potentially well suited to implantation to restricted spaces in the jawbone, while wider implants, such as those of FIG. 13, are optionally used for larger spaces. Potentially, using a wider implant, where practical due to support consideration, provides improved outcome, including more stable support of the dental implant.

In some embodiments, the smooth trans-mucosal region protrudes about 1 mm coronally beyond the bone line when the implant is implanted. In some embodiments, the protrusion is about 0.5 mm, 1 mm, 1.5 mm, 2 mm, or another longer, shorter, or intermediate distance. The boundary between an implant and an abutment creates an environment which is potentially vulnerable to colonization by infectious bacteria. Bone, in particular, is itself somewhat more vulnerable to infection than soft tissues. Potentially, raising the implant/abutment boundary above the bone line helps isolate the bone from the abutment. FIGS. 12D-12E illustrate relative positioning of an abutment, a dental implant, and a bone line 1204. In some embodiments, a trans-mucosal region comprises a widening flare in the apical-coronal direction. In some embodiments, the trans-mucosal region narrows in this direction. In some embodiments, the trans-mucosal region comprises a region of constant width.

One-piece abutment designs, such as are shown in FIGS. 12F-12H, comprise an implant section 1210, and an abutment section 1212A, 1212B, 1212C. In some embodiments of the invention, the implant section comprises, for example, a three-cutaway region implant as shown, or any other outer surface implant body design, for example, one- and two-cutaway designs as described herein. Exemplary abutment sections 1212A, 1212B, 1202A, 1202B show differences in abutment height (for use, for example, with prosthetic crowns for different-sized teeth and/or jaw locations). Exemplary abutment section 1212C, in some embodiments of the invention, comprises a concavity 1213 rising from the base of the abutment region. A potential advantage of concavity 1213 is to allow more room for the ingrowth of soft tissues in the vicinity of the implant and abutment. However, a variety of abutment section designs are known in the art, any one of which can be integrated, in some embodiments of the invention, with a corresponding implant body design comprising one or more cutaway regions. A potential advantage of a one-piece abutment/implant design is that there is no joint region between the two parts to serve as a potential locus of infection. In some embodiments, the trans-mucosal region comprises an extension and/or modification of a lower (apical) portion of the abutment section shape. In some embodiments, the trans-mucosal region comprises an extension and/or modification of an upper (coronal) portion of the dental implant section shape. In some embodiments of the invention, the trans-mucosal region comprises a distinct design, for example, as described hereinabove in relation to trans-mucosal regions 1201, 1310.

It should be noted that any design described herein, for example, either for bore-attachment of an abutment, or for one-piece provision of an abutment, is modifiable, for some embodiments of the invention, to angle the abutment protrusion relative to axis of the dental implant body. The range of available angles is potentially wider for bore-attached abutments, by angling the bore in the implant body, since the abutment itself potentially does not interfere with adjacent teeth or other structures as the implant is attached. In some embodiments of the invention, a portion of the bore which interlocks with an attachment tool is parallel to the implant body, such that the tool does not create off-axis interference during insertion, while the angling of threads and/or other structures of the implant for securing the abutment impart a desired attachment angle.

It is a potential advantage to provide a smooth surface for portions of a dental implant which protrude beyond the bone line, to reduce the extent of bacterial colonization. In some embodiments, the smooth protruding part 1201 comprises a portion having three-fold rotational symmetry. Optionally, a face of the smooth protruding part is oriented with respect to the jawline, for example, to run generally in the same direction.

In some embodiments, a smooth protruding region 1310 is provided which extends above the bone line when the implant is in its planned position. Potentially, the smooth surface of the trans-mucosal region discourages bacterial colonization, reducing an incidence of infectious inflammation in the region of the implant. In some embodiments, the protruding region 1310 is provided above one or more cutaway regions 1301, for example, three regions as shown here, but in some embodiments one or two cutaway regions, or another number of cutaway regions.

It is expected that during the life of a patent maturing from this application many relevant dental implant systems will be developed and the scope of the term "dental implant" is intended to include all such new technologies a priori.

As used herein the term "about" refers to within ±10%.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

What is claimed is:

1. A dental implant system, comprising:
   a. a dental implant for rotationally-oriented implantation in a jaw bone, comprising:
      i. a body having a longitudinal extent along a coronal-apical axis, said body sized for implanting of an intrabony portion thereof within a jaw bone;
      said body having three distinct facing directions around said coronal-apical axis, each said facing direction is defined by a feature of a shape of an outer surface along said longitudinal extent; each said facing direction is defined by an orientation of a cutaway region at a coronal region of said implant body and relative to said coronal-apical axis; said body having exactly three of said cutaway regions; said cutaway regions are radially symmetrically arranged around said coronal-apical axis; and
      ii. a circular bore hole extending apically along the coronal-apical axis from an aperture on a coronal end of the body; said bore hole comprising a keying pattern for receiving a keyed portion of a dental implant implanting tool; wherein
      said keying pattern is characterized by complementary keying having a three-fold rotational symmetry and arranged to interlock with said keyed portion in one of exactly three mating orientations such that each of said three mating orientations correspond to one of said three facing directions; and wherein the rotational symmetry orientation of said dental implant implanting tool corresponds to the rotational symmetry orientation of said implant such that said orientation of said implant is determined without inspection of said implant itself; and
   b. a dental implant implanting tool configured for rotationally keyed insertion into a keying pattern of said dental implant, comprising:
      i. a keyed portion sized and shaped to interlock said keying pattern, said keying pattern being shaped for mating thereto in one of three mating orientations; and
      ii. said keyed portion being mateable to said dental implant in one of exactly three orientations; wherein
      said keyed portion, when mated to said dental implant, is rotatable by rotation of said implanting tool such that the rotational orientation of said implanting tool dependably indicates the rotational orientation of said dental implant such that said orientation of said implant is determined without direct inspection of said implant itself.

2. The dental implant system of claim 1, wherein said cutaway region is configured to be buried within bone when said dental implant is implanted.

3. The dental implant system of claim 1, wherein said three mating orientations are positioned in a sequence of relative angles around said coronal-apical axis which is the same as a sequence of relative angles in which said three facing directions are positioned around said coronal-apical axis.

4. The dental implant system of claim 3, wherein all of said relative angles are equal.

5. The dental implant system of claim 3, wherein the keying pattern further comprises at least four torque receiving surfaces configured to receive torque from said implanting tool when said dental implant and implanting tool are interlocked and said implanting tool is rotated.

6. The dental implant system of claim 3, wherein said keying pattern comprises complementary keying.

7. The dental implant system of claim 6, wherein said complementary keying is in the form of a non-regular polygon having a plurality of shape-keyed notches, at least a first of the notches being distinct in shape from at least a second of the notches.

8. The dental implant system of claim 1, wherein said keying pattern comprises a plurality of notches configured with a surface oriented to receive torquing force from said implanting tool, at least a first of said notches being distinct in shape from at least a second of said notches.

9. The dental implant system of claim 8, wherein said at least first notch comprises a plurality of notches.

10. The dental implant system of claim 8, wherein said plurality of notches comprises six notches equally distributed around said coronal-apical axis.

11. The dental implant system of claim 1, wherein said keying pattern comprises a non-regular polygonal prism defined by surfaces of a bore hole, said non-regular polygonal prism being configured such that said interlocking portion is insertable to it in one of exactly three orientations.

12. The dental implant system of claim 11, wherein said non-regular polygonal prism is a non-regular hexagonal prism.

13. The dental implant system of claim 1, said dental implant further comprising a bore hole extending apically along said coronal-apical axis from an aperture on a coronal end of said body;
   said bore hole comprising at least one longitudinally extending wall portion, wherein a more apical section of said longitudinally extending wall portion is offset radially outward relative to a more coronal section thereof;
   wherein a region defined by said radially offset section, is configured to interlock with a dental implant implanting tool having a portion bearing an elastic element and sized to insert within said bore hole, when said implanting tool is fully inserted into said bore hole.

14. The dental implant system of claim 1, wherein said interlocking portion comprises indexed teeth complementary in size and position to at most three of said at least four torque-receiving surfaces.

15. The dental implant system of claim 1, wherein said keyed portion, when mated to said dental implant, is rotatable by rotation of said implanting tool such that it imparts torque to said dental implant.

16. The dental implant system of claim 1, wherein said keyed portion comprises a polygon complementary to a complementary keying in the form of a non-regular polygon.

17. The dental implant system of claim 1, wherein said implant body, where said cutaway regions are located, is characterized by a non-circular cross-sectional shape.

18. The dental implant system of claim 17, wherein said non-circular cross-sectional shape comprises a curved edge.

19. The dental implant system of claim 17, wherein said non-circular cross-sectional shape comprises an angled edge.

20. The dental implant system of claim 1, wherein said implant comprises three cutaway regions comprising curved edges.

21. The dental implant system of claim 1, wherein said complementary keying limits the orientation of an insertion of said dental implant implanting tool.

22. The dental implant system of claim 1, wherein said keying pattern comprises notches or hexagon walls configured for receiving said keyed portion of said dental implant implanting tool and for receiving an abutment.

* * * * *